United States Patent
West

(10) Patent No.: US 6,928,387 B1
(45) Date of Patent: Aug. 9, 2005

(54) CIRCUIT AND METHOD FOR DISTRIBUTING EVENTS IN AN EVENT STREAM

(75) Inventor: Burnell G. West, Half Moon Bay, CA (US)

(73) Assignee: Credence Systems Corporation, San Jose, CA (US)

( * ) Notice: Subject to any disclaimer, the term of this patent is extended or adjusted under 35 U.S.C. 154(b) by 0 days.

(21) Appl. No.: 10/853,632

(22) Filed: May 24, 2004

Related U.S. Application Data

(63) Continuation-in-part of application No. 10/056,287, filed on Jan. 23, 2002.

(51) Int. Cl.[7] .............................. G06F 3/00; H04L 7/00
(52) U.S. Cl. ........................ 702/178; 326/40; 375/372; 377/110; 703/17; 714/25
(58) Field of Search .................. 702/79, 102, 176, 702/177, 178; 710/71, 305; 341/100; 326/40; 377/110, 49; 703/17; 714/25, 45; 375/345, 372; 368/113

(56) References Cited

U.S. PATENT DOCUMENTS

| | | | |
|---|---|---|---|
| 4,741,004 A | * | 4/1988 | Kane .......................... 377/110 |
| 6,362,647 B1 | * | 3/2002 | Nakaya ........................ 326/40 |
| 2002/0133325 A1 | * | 9/2002 | Hoare et al. .................. 703/17 |
| 2002/0188888 A1 | * | 12/2002 | Rivoir .......................... 714/25 |
| 2003/0035502 A1 | * | 2/2003 | Boerker ....................... 375/372 |

* cited by examiner

Primary Examiner—Michael Nghiem
Assistant Examiner—John Le
(74) Attorney, Agent, or Firm—Wagner, Murabito & Hao LLP

(57) ABSTRACT

A circuit and method for distributing events in an event stream. A circuit for distributing events in a signal into a plurality of channels of circuitry capable of timestamping events is described. The circuit includes a first plurality of flip-flops arranged in a cascading configuration. The cascading configuration distributes a primary event stream into a first plurality of secondary event streams on each successive rising edge of the primary event stream. The circuit also includes a second plurality of flip-flops arranged in another cascading configuration for distributing the primary event stream. The primary event stream is distributed into a second plurality of secondary event streams on each successive falling edge of said primary event stream.

22 Claims, 12 Drawing Sheets

CIRCUIT AND METHOD FOR DISTRIBUTING EVENTS IN AN EVENT STREAM

REFERENCE TO PRIOR U.S. APPLICATION

This application is a continuation-in-part to the commonly owned, co-pending patent application, Ser. No. 10/056,287, entitled "Circuit and Method for Distributing Events in an Event Stream," with filing date Jan. 23, 2002, and assigned to the assignee of the present invention.

This application claims priority to the co-pending patent application, Ser. No. 10/056,287, entitled "Circuit and Method for Distributing Events in an Event Stream," with filing date Jan. 23, 2002, and assigned to the assignee of the present invention, the disclosure of which is hereby incorporated herein by reference.

BACKGROUND OF THE INVENTION

1. Field of the Invention

The present invention relates to electronic circuits and to electronic signals. More particularly, the present invention relates to measuring the times at which events occur in electronic signals.

2. Related Art

It is often desirable to detect and record the times at which events occur in an event stream. An event stream is an electronic signal having multiple events. The electronic signal having multiple events can be a single-ended signal or a differential signal. A single-ended signal consists of a single signal. In this case, the term event refers to a transition from a low level to a high level (i.e., a rising edge transition) or a transition from a high level to a low level (i.e., a falling edge transition). On the other hand, a differential signal consists of a pair of signals. The first signal is at a logic high level whenever the second signal is at a logic low level, and the first signal is at a logic low level whenever the second signal is at a logic high level. In this case, the term event refers to a transition from a high level to a low level on one signal and a simultaneous transition from a low level to a high level on the other signal. The time of this event is the moment when the voltages on the two signals are equal.

One situation where it is desirable to detect and record the times at which events occur in an event stream is while testing/debugging a semiconductor device. In this situation, a semiconductor device is electrically coupled to a tester. The tester is a machine that generates one or more test signals and provides the one or more test signals to one or more input terminals on the semiconductor device. The one or more test signals cause operations to occur in the semiconductor device and cause the semiconductor device to output one or more output signals or event streams. The event streams can then be analyzed by the tester to determine whether or not the semiconductor device is operating properly.

To detect and record the times at which events occur in an event stream, the event stream can be provided to a timestamp circuit, which generates a timestamp. A timestamp is a digital representation of the time at which an event occurs in an event stream. When the first event in the event stream occurs, the timestamp circuit generates a first timestamp for the first event thereby recording the time at which the first event occurs. When the second event in the event stream occurs, the timestamp circuit generates a second timestamp for the second event thereby recording the time at which the second event occurs. When the third event in the event stream occurs, the timestamp circuit generates a third timestamp for the third event thereby recording the time at which the first event occurs, and so on.

As used herein, a timestamp circuit is a circuit that is responsive to a reference clock and that creates a digital representation of the time at which an event occurs. The digital representation of the time at which an event occurs has two components. The first component is the specific clock cycle of the reference clock within which the event occurs. The second component is the time at which the event occurs within the specific clock cycle of the reference clock. Since each event is represented by the two components which are generated with respect to a reference clock, subsequent processing steps can easily determine timing relationships between each event which is useful when debugging/testing an integrated circuit device.

Timestamp circuits can generate timestamps for all of the events in an event stream well as long as the event rate in the event stream is relatively low (e.g., less than two events every 2.5 ns). However, when the event rate in the event stream is relatively high, as is the case with many event streams, timestamp circuits cannot record all of the events in the event stream. This is because a minimum period of time must elapse between consecutive events (e.g., 2.5 ns) for a timestamp circuit to correctly record consecutive events. One solution to this problem is to design a timestamp circuit that can record all of the events in the high event rate event streams. Unfortunately, such timestamp circuits cannot be designed using conventional semiconductor fabrication technologies or are too expensive to implement using conventional technologies.

SUMMARY OF THE INVENTION

The present invention provides a technique for distributing events in a primary event stream. The primary event stream is typically an output by a semiconductor device that is being tested/debugged. According to the technique, the events in the primary event stream are distributed across multiple secondary event streams in such a way that the event rate in each of the secondary event streams is lower than the event rate in the primary event stream, but the relative timing of the events in the primary event stream is maintained in each of the secondary event streams. The secondary event streams can then be provided to respective timestamp circuits, which record the times at which events occur in the secondary event streams. Since the relative timing of the events in the primary event stream is maintained in each of the secondary event streams, the multiple timestamp circuits collectively record the times at which events occur in the primary event stream.

A circuit for timestamping events in a signal is described. The circuit includes a first plurality of flip-flops arranged in a cascading configuration. The cascading configuration distributes a primary event stream into a first plurality of secondary event streams on each successive rising edge of the primary event stream. The circuit also includes a second plurality of flip-flops arranged in another cascading configuration for distributing the primary event stream. The primary event stream is distributed into a second plurality of secondary event streams on each successive falling edge of said primary event stream.

Various embodiments, aspects, and advantages of the present invention will become apparent from the following descriptions and the accompanying drawings.

BRIEF DESCRIPTION OF THE DRAWINGS

For a more complete understanding of the present invention and for further embodiments, aspects, and advantages, reference is now made to the following description taken in conjunction with the accompanying drawings, in which.

DETAILED DESCRIPTION OF THE INVENTION

Figure 1:
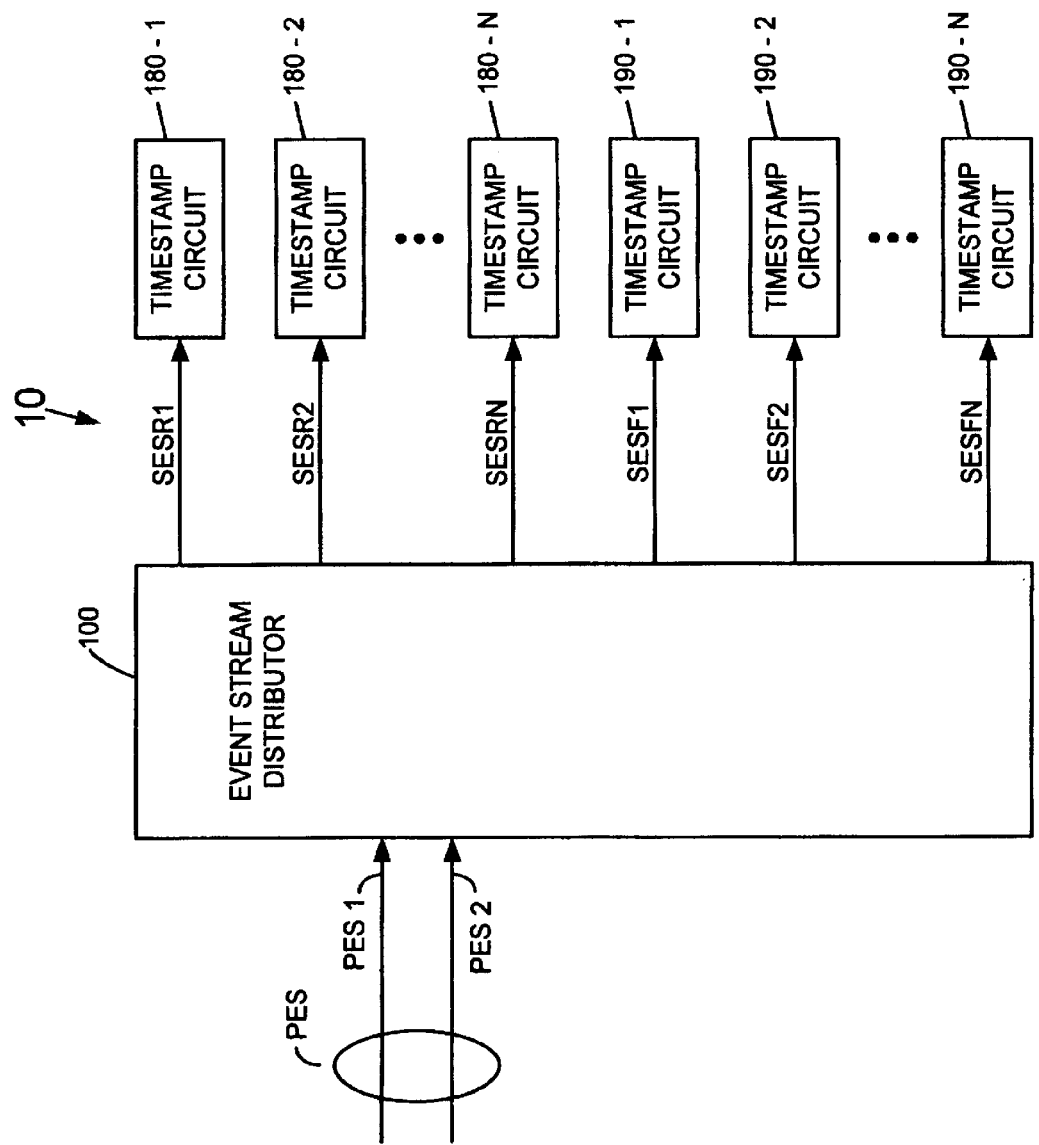
FIG. 1 is a block diagram of a timestamp circuit, according to some embodiments of the present invention.

Reference will now be made in detail to the preferred embodiments of the present invention, a circuit and method distributing events in an event stream, examples of which are illustrated in the accompanying drawings. Like reference numerals are used for like and corresponding parts of the various drawings.

Accordingly, various embodiments of the present invention are described illustrating a circuit and method for distributing events in a signal through a plurality of secondary event streams. Embodiments of the present invention provide for precise marking of events in a primary event stream, even though the event rate in the primary event stream is high. Moreover, embodiments of the present invention provide for distribution of events into a plurality of channels of circuitry capable of timestamping events through a cascading configuration of flip-flops that is stable since the input signal is directed to a single flip-flop.

I. Timestamp Circuit Including an Event Stream Distributor and Timestamp Circuits FIG. 1 is a block diagram of a timestamp system 10, according to some embodiments of the present invention. Timestamp system 10 includes an event stream distributor 100, timestamp circuits 180 (separately labeled 180-1, 180-2, ..., 180-N, where N=1, 2, 3, ...), and timestamp circuits 190 (separately labeled 190-1, 190-2, ..., 190-N, where N=1, 2, 3, ...)

Timestamp system 10 receives a primary event stream PES that includes events. In the embodiment shown, primary event stream PES is a differential signal that consists of two signals: non-inverted primary event stream PES1 and inverted primary event stream PES2. In other embodiments, primary event stream PES can be a single-ended signal.

Event stream distributor 100 distributes the events in non-inverted primary event stream PES1 among multiple rising edge secondary event streams SESR (separately labeled SESR1, SESR2, ..., SESRN, where N=1, 2, 3, ...). More specifically, event stream distributor 100 distributes the rising edge events in non-inverted primary event stream PES1 such that the first rising edge event is provided to timestamp circuit 180-1, the second rising edge event is provided to timestamp circuit 180-2, ..., the Nth rising edge event is provided to timestamp circuit 180-N, the N+1$^{th}$ rising edge event is provided to timestamp circuit 180-1, the N+2$^{th}$ rising edge event is provided to timestamp circuit 180-2, ..., the 2N$^{th}$ rising edge event is provided to timestamp circuit 180-N, and so on.

Similarly, event stream distributor 100 distributes the events in inverted primary event stream PES2 among multiple falling edge secondary event streams SESF (separately labeled SESF1, SESF2, ..., SESFN, where N=1, 2, 3, ...). More specifically, event stream distributor 100 distributes falling edge events in inverted primary event stream PES2 such that the first falling edge event is provided to timestamp circuit 190-1, the second falling edge event is provided to timestamp circuit 190-2, ..., the N$^{th}$ falling edge event is provided to timestamp circuit 190-N, the N+1$^{th}$ falling edge event is provided to timestamp circuit 190-1, the N+2$^{th}$ falling edge event is provided to timestamp circuit 190-2, ..., the 2N$^{th}$ falling edge event is provided to timestamp circuit 190-N, and so on.

Timestamp circuits 180 and 190 generate a timestamp for each event that occurs in their respective secondary event streams. An exemplary timestamp circuit, which can be used for timestamp circuits 180 and 190, is disclosed in co-pending and commonly assigned U.S. patent application, Ser. No. 09/643,576, entitled "Time-To-Digital Converter," which is herein incorporated by reference in its entirety. This Application teaches a technique for generating a digital representation of the time at which an event occurs using two components. The first component is the leading edge of the specific reference clock cycle within which the event appears, and the second component is an integer M<N, where NdT is equal to the period of the reference clock and M is a number of time intervals dT after the leading edge of the reference clock such that the event occurs between MdT and (M+1)dT. Thus, multiple timestamp circuits of this type can each receive a secondary event stream from the event stream distributor 100 of the present invention and record the times at which events occur in each of these secondary event streams. Since the relative timing of the events in the primary event stream is maintained in each of the secondary event streams via the timestamp circuits, the timing of the events in the primary event stream can be reconstructed and thus used when debugging/testing an integrated circuit device.

It should be recognized that the primary event stream PES can be distributed across any number of secondary event streams SES. As those of ordinary skill in the art will recognize, the number of secondary event streams SES required in a particular application is a function of (1) the maximum expected event rate in the primary event stream PES; and (2) the minimum period of time that must elapse between consecutive events for a particular type of timestamp circuit to accurately record all of the events in the primary event stream PES.

II. Event Stream Distributor Using Johnson Counters

A. Structure

Figure 2:
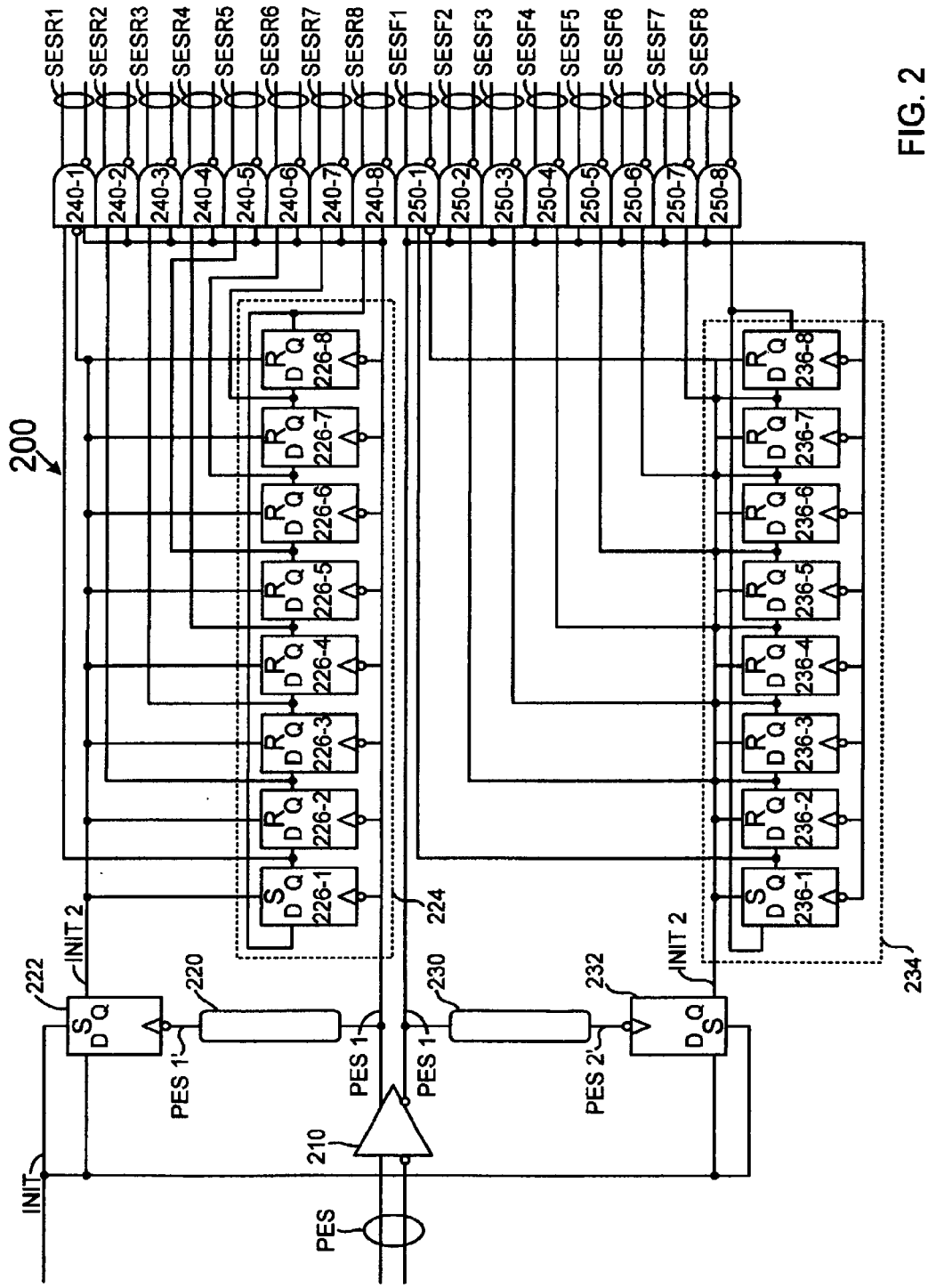
FIG. 2 is a schematic diagram of an event stream distributor that uses Johnson counters, according to some embodiments of the present invention.

FIG. 2 is a schematic diagram of an event stream distributor 200, according to some embodiments of the present invention. Event stream distributor 200 includes an input portion, a rising edge distributor, and a falling edge distributor. The input portion includes a buffer 210. The rising edge distributor includes a delay element 220, a D flip-flop 222, a Johnson counter 224, and AND gates 240 (separately labeled 240-1 through 240-8). Johnson counter 224 includes D flip-flops 226 (separately labeled 226-1 through 226-8). The falling edge distributor includes a delay element 230, a D flip-flop 232, a Johnson counter 234, and AND gates 250 (separately labeled 250-1 through 250-8). Johnson counter 234 includes D flip-flops 236 (separately labeled 236-1 through 236-8).

Buffer 210 is coupled to receive a primary event stream PES. In the embodiment shown, primary event stream PES is a differential signal. In other embodiments, primary event stream PES is a single-ended signal. Buffer 210 receives primary event stream PES, buffers primary event stream PES, and outputs a non-inverted primary event stream PES1 at its non-inverting output and outputs an inverted primary event stream PES2 at its inverting output.

Delay element 220 is coupled to receive primary event stream PES1 at its input. Delay element 220 delays non-inverted primary event stream PES1 and outputs delayed primary event stream PES1'.

D flip-flop 222 is coupled to receive delayed primary event stream PES1' at its inverting clock input. D flip-flop 222 is also coupled to receive an initialization signal INIT at its set S input and at its D input. D flip-flop 222 outputs an initialization signal INIT1 at its Q output. Initialization signal INIT1 is used to set D flip-flop 226-1 and reset D flip-flops 226-2 through 226-8.

Each D flip-flop 226 of Johnson counter 224 is coupled to receive non-inverted primary event stream PES1 at its inverting clock input. As such, D flip-flops 226 are simultaneously clocked by the falling edges in primary event stream PES1. D flip-flops 226 of Johnson counter 224 are coupled to one another in a ring-like configuration. Specifically, the Q output of D flip-flop 226-1 is coupled to the D input of D flip-flop 226-2, the Q output of D flip-flop 226-2 is coupled to the D input of D flip-flop 226-3, the Q output of D flip-flop 226-3 is coupled to the D input of D flip-flop 226-4, and so on until the Q output of D flip-flop 226-8 is coupled to the D input of D flip-flop 226-1. The set S input of D flip-flop 226-1 is coupled to receive initialization signal INIT1, and the reset R inputs of D flip-flops 226-2 through 226-8 are coupled to receive initialization signal INIT1. When initialization signal INTT1 is asserted, D flip-flop 226-1 is set and D flip-flops 226-2 through 226-8 are reset.

Each AND gate 240 is coupled to receive non-inverted primary event stream PES1 at a first non-inverting input. Each AND gate 240 is also coupled to a respective Q output of a respective D flip-flop 226 at a second non-inverting input. AND gate 240-1 includes an inverting input that is coupled to receive initialization signal INIT1. Each AND gate 240 outputs a respective rising edge secondary event stream SESR (separately labeled SESR1 through SESR8).

In the embodiment shown, secondary event streams SESR are differential signals. In other embodiments, secondary event streams SESR can be single-ended signals.

Delay element 230 is coupled to receive inverted primary event stream PES2 at its input terminal. Delay element 230 delays inverted primary event stream PES2 and outputs delayed primary event stream PES2'.

D flip-flop 232 is coupled to receive delayed primary event stream PES2' at its inverting clock input. D flip-flop 232 is also coupled to receive an initialization signal INIT at its set S input and at its D input. D flip-flop 232 outputs an initialization signal INIT2 at its Q output. Initialization signal INIT2 is used to set D flip-flop 236-1 and reset D flip-flops 236-2 through 236-8.

Each D flip-flop 236 of Johnson counter 234 is coupled to receive inverted primary event stream PES2 at its inverting clock input. As such, D flip-flops 236 are simultaneously clocked by the falling edges of inverted primary event stream PES2. D flip-flops 236 of Johnson counter 234 are coupled to one another in a ring-like configuration. Specifically, the Q output of D flip-flop 236-1 is coupled to the D input of D flip-flop 236-2, the Q output of D flip-flop 236-2 is coupled to the D input of D flip-flop 236-3, the Q output of D flip-flop 236-3 is coupled to the D input of D flip-flop 236-4, and so on until the Q output of D flip-flop 236-8 is coupled to the D input of D flip-flop 236-1. The set S input of D flip-flop 236-1 is coupled to receive initialization signal INIT2, and the reset R inputs of D flip-flops 236-2 through 236-8 are coupled to receive initialization signal INIT2. When initialization signal INIT2 is asserted, D flip-flop 236-1 is set and D flip-flops 236-2 through 236-8 are reset.

Each AND gate 250 is coupled to receive inverted primary event stream PES2 at a first non-inverting input. Each AND gate 250 is also coupled to a respective Q output of a respective D flip-flop 236 at a second non-inverting input. AND gate 250-1 includes an inverting input that is coupled to receive initialization signal INIT2. Each AND gate 250 outputs a respective falling edge secondary event stream SESF (separately labeled SESF1 through SESF8). In the embodiment shown, secondary event streams SESF are differential signals. In other embodiments, secondary event streams SESF can be single-ended signals.

B. Operation

Figure 3:
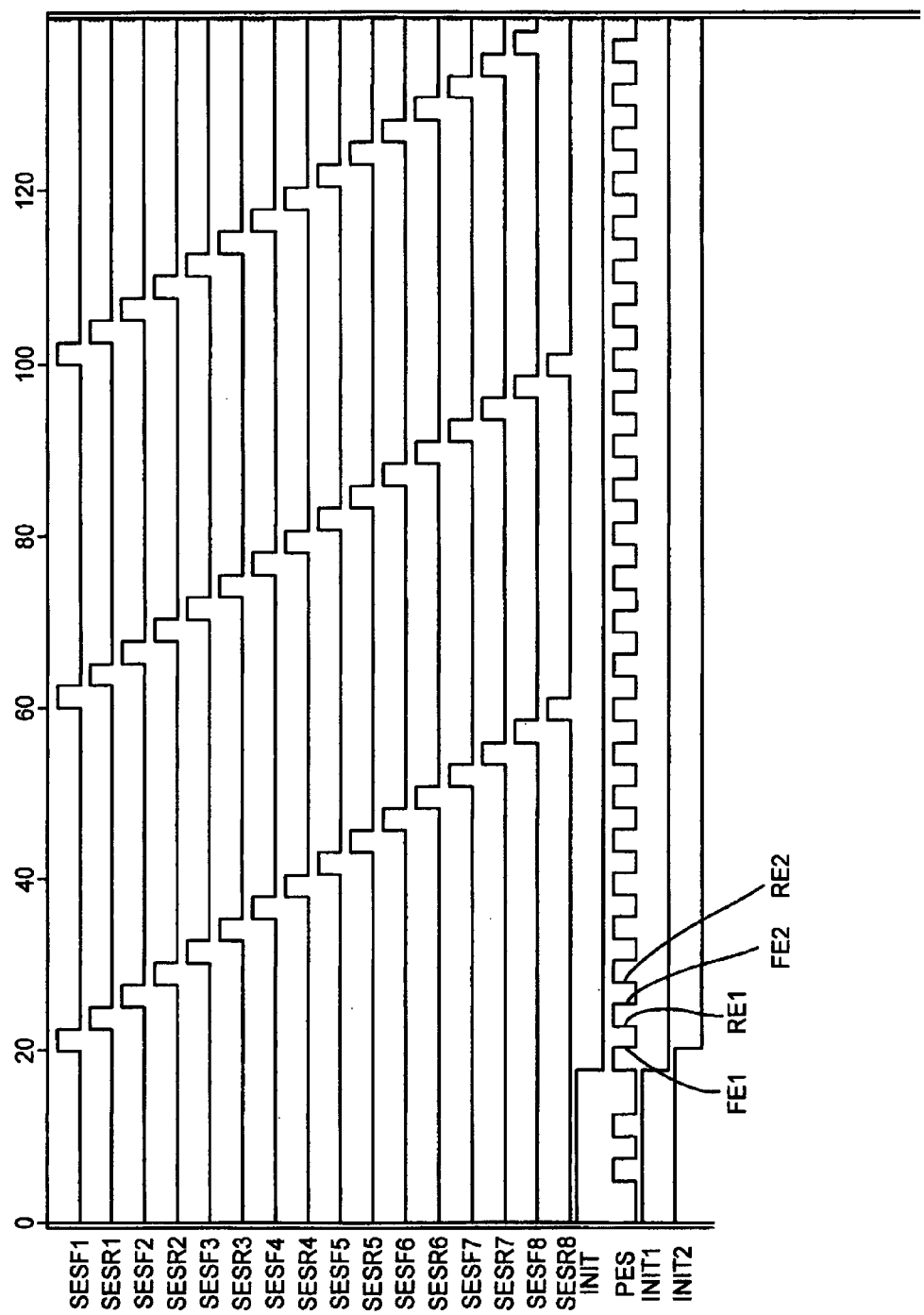
FIG. 3 is a timing diagram that includes waveforms for a primary event stream and corresponding secondary event streams.

Event stream distributor 200 operates in an initialization mode and a normal mode. When operating in initialization mode, Johnson counters 224 and 234 are initialized. When operating in normal mode, the rising edge distributor of event stream distributor 200 distributes rising edge events in primary event stream PES among rising edge secondary event streams SESR1 through SESR8, and the falling edge distributor of event stream distributor 200 distributes falling edge events in primary event stream PES among secondary event streams SESF1 through SESF8. Reference is made to the timing diagram of FIG. 3 when describing the operation of event stream distributor 200.

Event stream distributor 200 is placed in initialization mode by raising and holding initialization signal INIT at a logic high level. A falling edge in primary event stream PES travels through buffer 210 and appears at the non-inverting output of buffer 210 as a falling edge in inverted primary event stream PES1. This falling edge travels through delay element 220 and clocks D flip-flop 222 thereby raising initialization signal INIT1 to a logic high level. This sets D flip-flop 226-1 and resets D flip-flops 222-2 through 226-8. Thus, a logic high signal appears at the Q output of D flip-flop 226-1, which enables AND gate 240-1, while logic low signals appear at the Q outputs of D flip-flops 226-2 through 2268, which disable AND gates 240-2 through 240-8.

Similarly, a rising in primary event stream PES travels through buffer 210 and appears at the inverting output of buffer 210 as a falling edge in inverted primary event stream PES2. This falling edge travels through delay element 230 and clocks D flip-flop 232 thereby raising initialization signal iNIT2 to a logic high level. This sets D flip-flop 236-1 and resets D flip-flops 232-2 through 236-8. Thus, a logic high signal appears at the Q output of D flip-flop 236-1, which enables AND gate 250-1, while logic low signals appear at the Q outputs of D flip-flops 236-2 through 236-8, which disable AND gates 250-2 through 250-8.

Note that secondary event streams SESR1 through SESR8 and SESF1 through SESF8 are held at logic low levels when event stream distributor 200 is in initialization mode. Event stream distributor 200 is then taken out of initialization mode and placed in normal mode by lowering and holding initialization signal INIT at a logic low level.

When operating in normal mode, the falling edge distributor of event stream distributor 200 operates as follows. The first falling edge in primary event stream PES (labeled FE1 in FIG. 3) propagates through buffer 210 and appears at the inverting output of buffer 210 as a rising edge in inverted primary event stream PES2. The rising edge in inverted primary event stream PES2 propagates through AND gate 250-1 where it appears as the first rising edge in secondary event stream SESF1. Note that the rising edge in inverted primary event stream PES2 appears at the output of AND gate 250-1 since the Q output of D flip-flop 236-1 is at a logic high level, but does not appear at the outputs of AND gates 250-2 through 250-8 since the Q outputs of D flip-flops 236-2 through 236-8 are at logic low levels.

The first rising edge in primary event stream PES (labeled RE1 in FIG. 3) propagates through buffer 210 and appears at the inverting output of buffer 210 as a falling edge in inverted primary event stream PES2. This falling edge clocks D-flip flops 236-1 through 236-8 causing the logic high value stored in D flip-flop 236-1 to shift into D flip-flop 236-2. As a result, the Q output of D flip-flop 236-2 is held at a logic high level and the Q outputs of D flip-flops 236-1 and 236-3 through 236-8 are held at logic low levels, enabling AND gate 250-2 and disabling AND gates 250-1 and 250-3 through 250-8.

The second falling edge in primary event stream PES (labeled FE2 in FIG. 3) propagates through buffer 210 and appears at the inverting output of buffer 210 as a rising edge in inverted primary event stream PES2. The rising edge in inverted primary event stream PES2 propagates through AND gate 250-2 where it appears as the first rising edge in secondary event stream SESF2. Note that the rising edge in inverted primary event stream PES2 appears at the output of AND gate 250-2 since the Q output of D flip-flop 236-2 is at a logic high level, but does not appear at the outputs of AND gates 250-1 and 250-3 through 250-8 since the Q outputs of D flip-flops 236-2 through 236-8 are at logic low levels.

The second rising edge in primary event stream PES (labeled RE2 in FIG. 3) propagates through buffer 210 and appears at the inverting output of buffer 210 as a falling edge in inverted primary event stream PES2. This falling edge clocks D-flip flops 236-1 through 236-8 causing the logic high value stored in D flip-flop 236-2 to shift into D flip-flop 236-3. As a result, the Q output of D flip-flop 236-3 is held at a logic high level and the Q outputs of D flip-flops 236-1 through 236-2 and 236-4 through 236-8 are held at logic low levels, enabling AND gate 250-3 and disabling AND gates 250-1 through 250-2 and 250-4 through 250-8.

The process described above continues so that the third falling edge in primary event stream PES appears as the first rising edge in secondary event stream SESF3, the fourth falling edge in primary event stream PES appears as the first rising edge in secondary event stream SESF4, the fifth falling edge in primary event stream PES appears as the first rising edge in secondary event stream SESFS, the sixth falling edge in primary event stream PES appears as the first rising edge in secondary event stream SESF6, the seventh falling edge in primary event stream PES appears as the first rising edge in secondary event stream SESF7, the eighth falling edge in primary event stream PES appears as the first rising edge in secondary event stream SESF8, the ninth falling edge in primary event stream PES appears as the second rising edge in secondary event stream SESF1, the tenth falling edge in primary event stream PES appears as the second rising edge in secondary event stream SESF2, the eleventh falling edge in primary event stream PES appears as the second rising edge in secondary event stream SESF3, and so on. Thus AND gates 250 function as a plurality of secondary event stream paths that are selectively enabled by output signals generated by Johnson counter 234.

For each falling edge in primary event stream PES, the propagation delay through buffer 210, the conductor/interconnect line between buffer 210 and its respective AND gate 250, and through its respective AND gate 250 may be slightly different. This is because the length of the conductor/interconnect lines may be different and since the delay through the buffer and each AND gate may be different. Using known calibration techniques, the differences between the propagation delays in each signal path can be measured. As a result, the relative timing between the falling edges in primary event stream PES can be maintained.

When operating in normal mode, the rising edge distributor of event stream distributor 200 operates as follows. The first rising edge in primary event stream PES (labeled RE1 in FIG. 3) propagates through buffer 210 and appears at the non-inverting output of buffer 210 as a rising edge in non-inverted primary event stream PES1. The rising edge in non-inverted primary event stream PES1 propagates through AND gate 240-1 where it appears as the first rising edge in secondary event stream SESR1. Note that the rising edge in non-inverted primary event stream PES1 appears at the output of AND gate 240-1 since the Q output of D flip-flop 226-1 is at a logic high level, but does not appear at the outputs of AND gates 240-2 through 240-8 since the Q outputs of D flip-flops 226-2 through 226-8 are at logic low levels.

The first falling edge in primary event stream PES (labeled FE1 in FIG. 3) propagates through buffer 210 and appears at the non-inverting output of buffer 210 as a failing edge in non-inverted primary event stream PES1. This falling edge clocks D flip flops 226-1 through 226-8 causing the logic high value stored in D flip-flop 226-1 to shift into D flip-flop 226-2. As a result, the Q output of D flip-flop 226-2 is held at a logic high level and the Q outputs of D flip-flops 226-1 and 226-3 through 226-8 are held at logic low levels, enabling AND gate 240-2 and disabling AND gates 240-1 and 240-3 through 240-8.

The second rising edge in primary event stream PES (labeled FE2 in FIG. 3) propagates through buffer 210 and appears at the non-inverting output of buffer 210 as a rising edge in non-inverted primary event stream PES1. The rising edge in non-inverted primary event stream PES1 propagates through AND gate 240-2 where it appears as the first rising edge in secondary event stream SESR2. Note that the rising edge in non-inverted primary event stream PES1 appears at the output of AND gate 240-2 since the Q output of D flip-flop 226-2 is at a logic high level, but does not appear at the outputs of AND gates 240-1 and 240-3 through 240-8 since the Q outputs of D flip-flops 226-1 and 226-3 through 226-8 are at logic low levels.

The second falling edge in primary event stream PES (labeled FE2 in FIG. 3) propagates through buffer 210 and appears at the non-inverting output of buffer 210 as a falling edge in non-inverted primary event stream PES1. This falling edge clocks D-flip flops 226-1 through 226-8 causing the logic high value stored in D flip-flop 226-2 to shift into D flip-flop 226-3. As a result, the Q output of D flip-flop 226-3 is held at a logic high level and the Q outputs of D flip-flops 226-1 through 226-2 and 226-4 through 226-8 are held at logic low levels, enabling AND gate 240-3 and disabling AND gates 240-1 through 240-2 and 240-4 through 240-8.

The process described above continues so that the third rising edge in primary event stream PES appears as the first rising edge in secondary event stream SESR3, the fourth rising edge in primary event stream PES appears as the first rising edge in secondary event stream SESR4, the fifth rising edge in primary event stream PES appears as the first rising edge in secondary event stream SESR5, the sixth rising edge in primary event stream PES appears as the first rising edge in secondary event stream SESR6, the seventh rising edge in primary event stream PES appears as the first rising edge in secondary event stream SESR7, the eighth rising edge in primary event stream PES appears as the first rising edge in secondary event stream SESR8, the ninth rising edge in primary event stream PES appears as the second rising edge in secondary event stream SESR1, the tenth rising edge in primary event stream PES appears as the second rising edge in secondary event stream SESR2, the eleventh rising edge in primary event stream PES appears as the second rising edge in secondary event stream SESR3, and so on. Thus AND gates 240 function as a plurality of secondary event stream paths that are selectively enabled by output signals generated by Johnson counter 224.

For each rising edge in primary event stream PES, the propagation delay through buffer 210, the conductor/interconnect line between buffer 210 and its respective AND gate 240, and through its respective AND gate 240 may be slightly different. This is because the length of the conductor/interconnect lines may be different and since the delay through the buffer and each AND gate may be different. Using known calibration techniques, the differences between the propagation delays in each signal path can be measured. As a result, the relative timing between the rising edges in primary event stream PES can be maintained.

Figure 4:
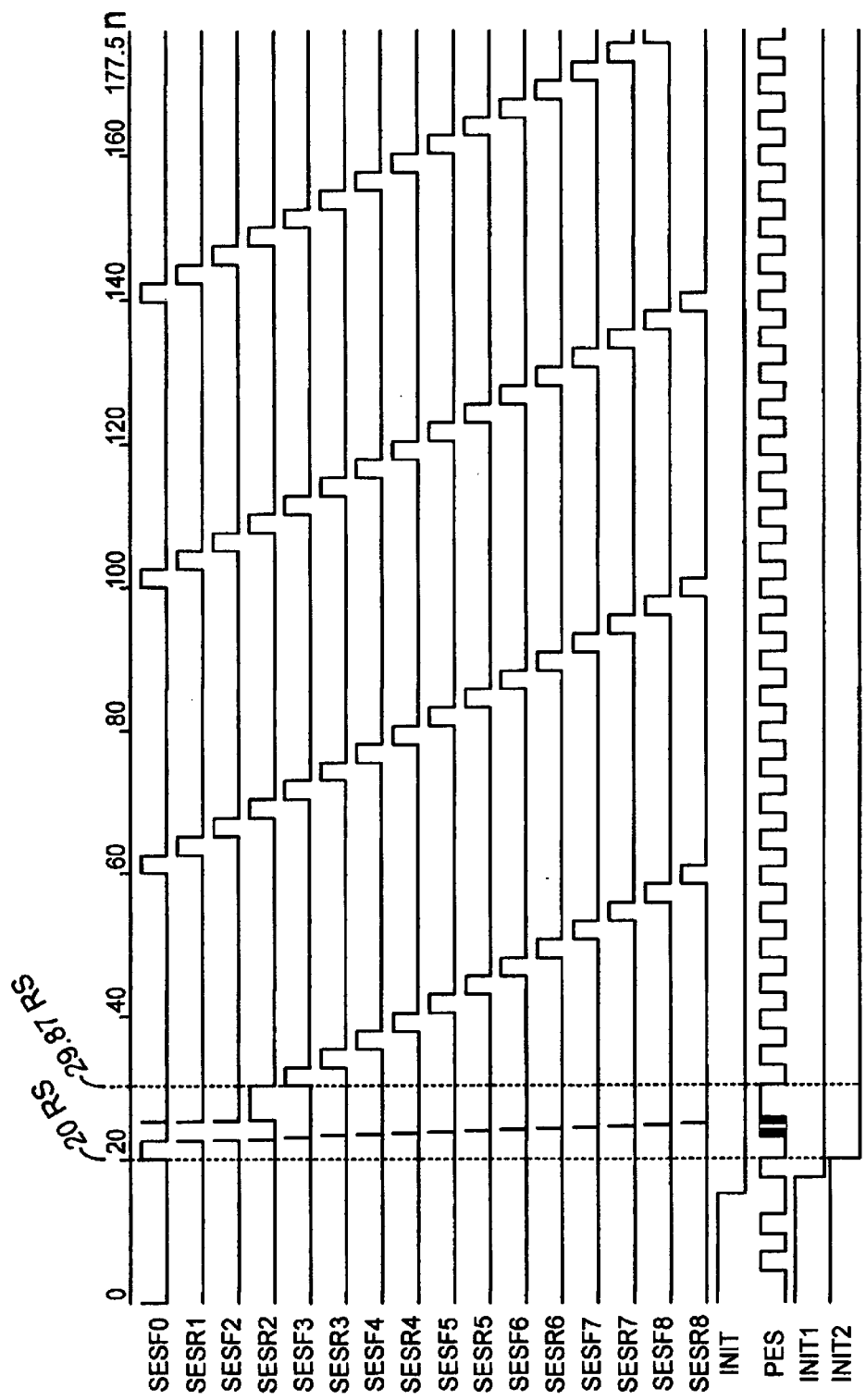
FIG. 4 is a timing diagram that includes waveforms for a primary event stream having a burst of events and corresponding secondary event streams.
Figure 5:
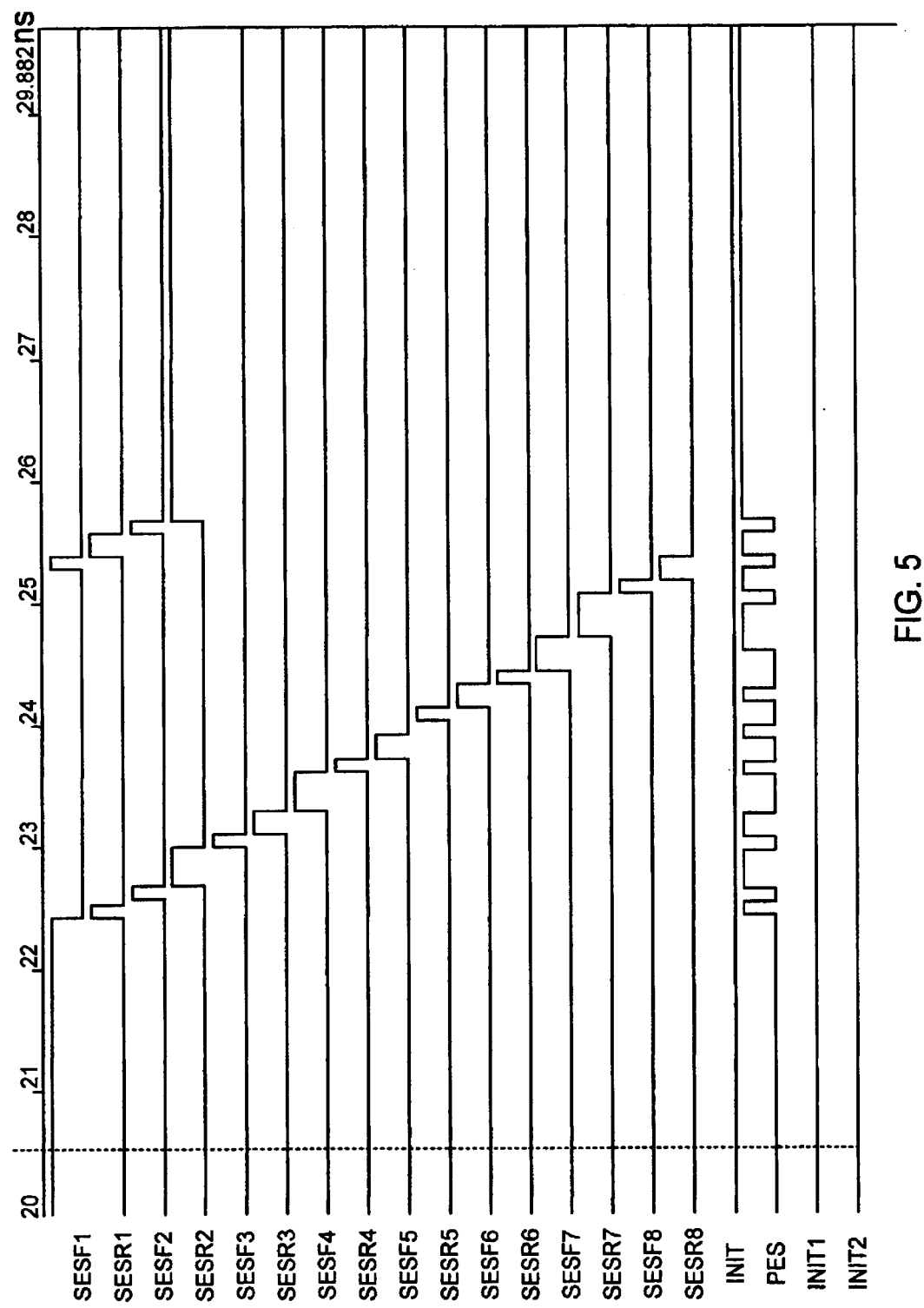
FIG. 5 is an expanded view of a portion of the timing diagram of FIG. 4.

One of the primary advantages of event stream distributor 200 is that it can be used to distribute a high event rate primary event stream across multiple secondary event streams. As such, the time at which each event occurs in the high event rate primary event stream can be recorded using multiple timestamp circuits. This is illustrated in FIG. 4. FIG. 4 is a timing diagram that shows a primary event stream PES that has a burst of high rate events that occur between 2 Ons and 3 Ons. FIG. 5 is a magnified portion of the timing diagram of FIG. 4 that shows how event stream distributor 200 distributes the burst of high rate events that occur between 2 Ons and 3 Ons across the multiple secondary event streams SESR1 through SESR8 and SESF1 through SESF8.

Although event stream distributor 200 distributes primary event stream PES across eight rising edge secondary event streams SESR and eight falling edge secondary event streams SESF, it should be recognized that event stream distributor 200 can easily be modified such that there can be any number of rising edge secondary event streams SESR and any number of falling edge secondary event streams SESF depending on the requirements of a particular application.

III. Event Stream Distributor Using 3-Bit Counters

A. Structure

Figure 6:
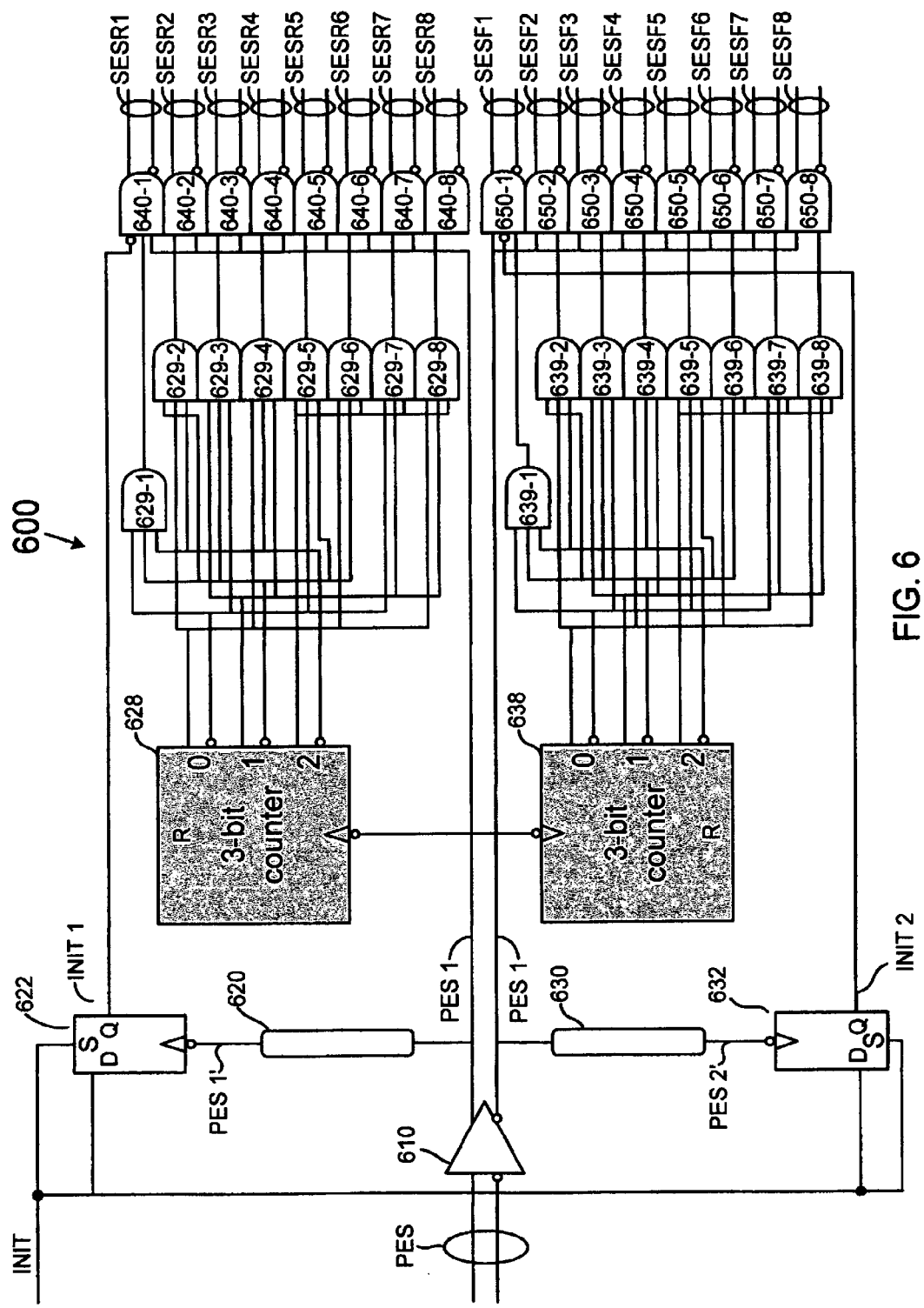
FIG. 6 is a schematic diagram of an event stream distributor that uses 3-bit counters, according to some embodiments of the present invention.

FIG. 6 is a schematic diagram of an event stream distributor 600, according to some embodiments of the present invention. Event stream distributor 600 is identical to event stream distributor 200 of FIG. 2 except that Johnson counter 224 has been replaced by 3-bit synchronous counter 628 and AND gates 629 (separately labeled 629-1 through 629-8), and Johnson counter 234 has been replaced by 3-bit synchronous counter 638 and AND gates 639 (separately labeled 639-1 through 639-8). The functions performed by 3-bit synchronous counter 628 and AND gates 629 taken together are identical to the functions performed by Johnson counter 224, and the functions performed by 3-bit synchronous counter 638 and AND gates 639 taken together are identical to the functions performed by Johnson counters 234.

Event stream distributor 600 has been found to be more economical than event stream distributor 200 if the maximum clock rate sustainable by 3-bit synchronous counters 328 and 338 is fast enough to keep up with the highest event rate in primary event stream PES. This is because 3-bit synchronous counter 328 and AND gates 329 together require less circuitry to implement than Johnson counter 224, and 3-bit synchronous counter 338 and AND gates 339 together require less circuitry to implement than Johnson counter 234.

Event stream distributor 600 includes an input portion, a rising edge distributor, and a falling edge distributor. The input portion includes a buffer 610. The rising edge distributor includes a delay element 620, a D flip-flop 622, a 3-bit synchronous counter 628, AND gates 629 (separately labeled 629-1 through 629-8), and AND gates 640 (separately labeled 640-1 through 640-8). The falling edge distributor includes a delay element 630, a D flip-flop 632, a 3-bit synchronous counter 638, AND gates 639 (separately labeled 639-1 through 639-8), and AND gates 650 (separately labeled 650-1 through 650-8).

Buffer 610 is coupled to receive a primary event stream PES. In the embodiment shown, primary event stream PES is a differential signal. In other embodiments, primary event stream PES is a single-ended signal. Buffer 610 receives primary event stream PES, buffers primary event stream PES, and outputs a non-inverted primary event stream PES1 at its non-inverting output and outputs an inverted primary event stream PES2 at its inverting output.

Delay element 620 is coupled to receive non-inverted primary event stream PES1 at its input. Delay element 620 delays non-inverted primary event stream PES1 and outputs delayed primary event stream PES1'.

D flip-flop 622 is coupled to receive delayed primary event stream PES1' at its inverting clock input. D flip-flop 622 is also coupled to receive an initialization signal INIT at its set S input and at its D input. D flip-flop 622 outputs an initialization signal INIT1 at its Q output. Initialization signal INIT1 is used to reset 3-bit synchronous counter 628.

3-bit synchronous counter 628 is coupled to receive non-inverted primary event stream PES1 at its inverting clock input. The reset R input of 3-bit synchronous counter 628 is coupled to receive initialization signal INIT1. 3-bit synchronous counter 628 has a first non-inverting output, a first inverting output, a second non-inverting output, a second inverting output, a third non-inverting output, and a third inverting output.

Each AND gate 629 includes three inputs. The inputs of each AND gate 629 are coupled to the first non-inverting output, the first inverting output, the second non-inverting output, the second inverting output, the third non-inverting output, and/or the third inverting output of 3-bit synchronous counter 628 in such a manner that the output of AND gate 629-1 is at a logic high level when the count of 3-bit synchronous counter 628 is 0, the output of AND gate 629-2 is at a logic high level when the count of 3-bit synchronous counter 628 is 1, the output of AND gate 629-3 is at a logic high level when the count of 3-bit synchronous counter 628 is 2, and so on until the output of AND gate 629-8 is at a logic high level when the count of 3-bit synchronous counter 628 is 7.

Each AND gate 640 is coupled to receive non-inverted primary event stream PES1 at a first non-inverting input. Each AND gate 640 is also coupled to respective outputs of respective AND gates 629 at a second non-inverting input. AND gate 640-1 is also coupled to receive initialization signal INIT1 at an inverting input. Each AND gate 640 outputs a respective rising edge secondary event stream SESR (separately labeled SESR1 through SESR8). In the embodiment shown, secondary event streams SESR are differential signals. In other embodiments, secondary event streams SESR can be single-ended signals.

Delay element 630 is coupled to receive inverted primary event stream PES2 at its input. Delay element 630 delays inverted primary event stream PES2 and outputs delayed primary event stream PES2'.

D flip-flop 632 is coupled to receive delayed primary event stream PES2' at its inverting clock input. D flip-flop 632 is also coupled to receive an initialization signal INIT at its set S input and at its D input. D flip-flop 632 outputs an initialization signal INIT2 at its Q output. Initialization signal INIT2 is used to reset 3-bit synchronous counter 638.

3-bit synchronous counter 638 is coupled to receive primary event stream PES2 at its inverting clock input. The reset R input of 3-bit synchronous counter 638 is coupled to receive initialization signal INIT2. 3-bit synchronous counter 638 has a first non-inverting output, a first inverting output, a second non-inverting output, a second inverting output, a third non-inverting output, and a third inverting output.

Each AND gate 639 includes three inputs. The inputs of each AND gate 639 are coupled to the first non-inverting output, the first inverting output, the second non-inverting output, the second inverting output, the third non-inverting output, and/or the third inverting output of 3-bit synchronous counter 638 in such a manner that the output of AND gate 639-1 is at a logic high level when the count of 3-bit synchronous counter 638 is 0, the output of AND gate 639-2 is at a logic high level when the count of 3-bit synchronous counter 638 is 1, the output of AND gate 639-3 is at a logic high level when the count of 3-bit synchronous counter 638 is 2, and so on until the output of AND gate 639-8 is at a logic high level when the count of 3-bit synchronous counter 638 is 7.

Each AND gate 650 is coupled to receive primary event stream PES2 at a first non-inverting input. Each AND gate 650 is also coupled to respective outputs of respective AND gates 639 at a second non-inverting input. AND gate 650-1 is also coupled to receive initialization signal INIT2 at an inverting input. Each AND gate 650 outputs a respective falling edge secondary event stream SESF (separately labeled SESF1 through SESF8). In the embodiment shown, secondary event streams SESF are differential signals. In other embodiments, secondary event streams SESF can be single-ended signals.

B. Operation

Event stream distributor 600 operates in an initialization mode and a normal mode. When operating in initialization mode, 3-bit synchronous counters 628 and 638 are initialized. When operating in normal mode, the rising edge distributor of event stream distributor 600 distributes rising edge events in primary event stream PES among secondary event streams SESR1 through SESR8, and the falling edge distributor of event stream distributor 600 distributes falling edge events in primary event stream PES among secondary event streams SESF1 through SESF8. Reference is made to the timing diagram of FIG. 3 when describing the operation of event stream distributor 600.

Event stream distributor 600 is placed in initialization mode by raising and holding initialization signal INIT at a logic high level. A falling edge in primary event stream PES propagates through buffer 610 and appears at the non-inverting output of buffer 610 as a falling edge in non-inverted primary event stream PES1. This falling edge travels through delay element 620 and clocks D flip-flop 622 thereby raising initialization signal INIT1 to a logic high level. This resets 3-bit synchronous counter 628. Thus, a logic high signal appears at the output of AND gate 629-1, which enables AND gate 640-1, while logic low signals appear at the outputs of AND gates 629-2 through 629-8, which disable AND gates 640-2 through 640-8.

Similarly, a rising edge in primary event stream PES propagates through buffer 610 and appears at the inverting output of buffer 610 as a falling edge in inverted primary event stream PES2. This falling edge travels through delay element 630 and clocks D flip-flop 632 thereby raising initialization signal INIT2 to a logic high level. This resets 3-bit synchronous counter 638. Thus, a logic high signal appears at the output of AND gate 639-1, which enables AND gate 650-1, while logic low signals appear at the outputs of AND gates 639-2 through 639-8, which disable AND gates 650-2 through 650-8.

Note that secondary event streams SESR1 through SESR8 and SESF1 through SESF8 are held at logic low levels when event stream distributor 600 is in initialization mode. Event stream distributor 600 is then taken out of initialization mode and placed in normal mode by lowering and holding initialization signal INIT at a logic low level.

When operating in normal mode, the falling edge distributor of event stream distributor 600 operates as follows. The first falling edge in primary event stream PES (labeled FE1 in FIG. 3) propagates through buffer 610 and appears at the inverting output of buffer 610 as a rising edge in inverted primary event stream PES2. The rising edge in inverted primary event stream PES2 propagates through AND gate 650-1 where it appears as the first rising edge in secondary event stream SESF1. Note that the rising edge in inverted primary event stream PES2 appears at the output of AND gate 650-1 since the output of AND gate 639-1 is at a logic high level, but does not appear at the outputs of AND gates 650-2 through 650-8 since the outputs of AND gates 639-2 through 639-8 are at logic low levels.

The first rising edge in primary event stream PES (labeled RE1 in FIG. 3) propagates through buffer 610 and appears at the inverting output of buffer 610 as a falling edge in inverted primary event stream PES2. This falling edge clocks 3-bit synchronous counter 638 causing the count to increment to a count of 1. As a result, the output of AND gate 639-2 is held at a logic high level and the outputs of AND gates 639-1 and 639-3 through 639-8 are held at logic low levels, enabling AND gate 650-2 and disabling AND gates 650-1 and 650-3 through 650-8.

The second falling edge in primary event stream PES (labeled FE2 in FIG. 3) propagates through buffer 610 and appears at the inverting output of buffer 610 as a rising edge in inverted primary event stream PES2. The rising edge in inverted primary event stream PES2 propagates through AND gate 650-2 where it appears as the first rising edge in secondary event stream SESF2. Note that the rising edge in inverted primary event stream PES2 appears at the output of AND gate 650-2 since the output of AND gate 639-2 is at a logic high level, but does not appear at the outputs of AND gates 650-1 and 650-3 through 650-8 since the outputs of AND gates 639-1 and 639-3 through 639-8 are at logic low levels.

The second rising edge in primary event stream PES (labeled RE2 in FIG. 3) propagates through buffer 610 and appears at the inverting output of buffer 610 as a falling edge in inverted primary event stream PES2. This falling edge clocks 3-bit synchronous counter 638 causing the count to increment to 2. As a result, the output of AND gate 639-3 is held at a logic high level and the outputs of AND gates 639-1 through 639-2 and 639-4 through 639-8 are held at logic low levels, enabling AND gate 650-3 and disabling AND gates 650-1 through 650-2 and 650-4 through 650-8.

The process described above continues so that the third falling edge in primary event stream PES appears as the first rising edge in secondary event stream SESF3, the fourth falling edge in primary event stream PES appears as the first rising edge in secondary event stream SESF4, the fifth falling edge in primary event stream PES appears as the first rising edge in secondary event stream SESF5, the sixth falling edge in primary event stream PES appears as the first rising edge in secondary event stream SESF6, the seventh falling edge in primary event stream PES appears as the first rising edge in secondary event stream SESF7, the eighth falling edge in primary event stream PES appears as the first rising edge in secondary event stream SESF8, the ninth falling edge in primary event stream PES appears as the second rising edge in secondary event stream SESF1, the tenth falling edge in primary event stream PES appears as the second rising edge in secondary event stream SESF2, the eleventh falling edge in primary event stream PES appears as the second rising edge in secondary event stream SESF3, and so on. Thus AND gates 650 function as a plurality of secondary event stream paths that are selectively enabled by output signals generated by 3-bit synchronous counter 638.

For each falling edge in primary event stream PES, the propagation delay through buffer 610, the conductor/interconnect line between buffer 610 and its respective AND gate 650, and through its respective AND gate 650 may be slightly different. This is because the length of the conductor/interconnect lines may be different and since the delay through the buffer and each AND gate may be different. Using known calibration techniques, the differences between the propagation delays in each signal path can be measured. As a result, the relative timing between the falling edges in primary event stream PES can be maintained.

When operating in normal mode, the rising edge distributor of event stream distributor 600 operates as follows. The first rising edge in primary event stream PES (labeled RE1 in FIG. 3) propagates through buffer 610 and appears at the non-inverting output of buffer 610 as a rising edge in non-inverted primary event stream PES1. The rising edge in non-inverted primary event stream PES1 propagates through AND gate 640-1 where it appears as the first rising edge in secondary event stream SESR1. Note that the rising edge in non-inverted primary event stream PES1 appears at the output of AND gate 640-1 since the output of AND gate 629-1 is at a logic high level, but does not appear at the outputs of AND gates 640-2 through 640-8 since the outputs of AND gates 629-2 through 629-8 are at logic low levels.

The first falling edge in primary event stream PES (labeled FE1 in FIG. 3) propagates through buffer 610 and appears at the non-inverting output of buffer 610 as a falling edge in non-inverted primary event stream PES1. This falling edge clocks 3-bit synchronous counter 628 causing the count to be incremented to 1. As a result, the output of AND gate 629-2 is held at a logic high level and the outputs of AND gates 629-1 and 629-3 through 629-8 are held at logic low levels, enabling AND gate 640-2 and disabling AND gates 640-1 and 640-3 through 640-8.

The second rising edge in primary event stream PES (labeled RE2 in FIG. 3) propagates through buffer 610 and appears at the non-inverting output of buffer 610 as a rising edge in non-inverted primary event stream PES1. The rising edge in non-inverted primary event stream PES1 propagates through AND gate 640-2 where it appears as the first rising edge in secondary event stream SESR2. Note that the rising edge in non-inverted primary event stream PES1 appears at the output of AND gate 640-2 since the output of AND gate 629-2 is at a logic high level, but does not appear at the outputs of AND gates 640-1 and 640-3 through 640-8 since the outputs of AND gates 629-1 and 6293 through 629-8 are at logic low levels.

The second falling edge in primary event stream PES (labeled FE2 in FIG. 3) propagates through buffer 610 and appears at the non-inverting output of buffer 610 as a falling edge in non-inverted primary event stream PES1. This falling edge clocks 3-bit synchronous counter 628 causing the count to increment to 2. As a result, the output of AND gate 629-3 is held at a logic high level and the outputs of AND gates 629-1 through 629-2 and 629-4 through 629-8 are held at logic low levels, enabling AND gate 640-3 and disabling AND gates 640-1 through 640-2 and 640-4 through 640-8.

The process described above continues so that the third rising edge in primary event stream PES appears as the first rising edge in secondary event stream SESR3, the fourth rising edge in primary event stream PES appears as the first rising edge in secondary event stream SESR4, the fifth rising edge in primary event stream PES appears as the first rising edge in secondary event stream SESR5, the sixth rising edge in primary event stream PES appears as the first rising edge in secondary event stream SESR6, the seventh rising edge in primary event stream PES appears as the first rising edge in secondary event stream SESR7, the eighth rising edge in primary event stream PES appears as the first rising edge in secondary event stream SESR8, the ninth rising edge in primary event stream PES appears as the second rising edge in secondary event stream SESR1, the tenth rising edge in primary event stream PES appears as the second rising edge in secondary event stream SESR2, the eleventh rising edge in primary event stream PES appears as the second rising edge in secondary event stream SESR3, and so on. Thus AND gates 640 function as a plurality of secondary event stream paths that are selectively enabled by output signals generated by 3-bit synchronous counter 628.

For each rising edge in primary event stream PES, the propagation delay through buffer 610, the conductor/interconnect line between buffer 610 and its respective AND gate 640, and through its respective AND gate 640 may be slightly different. This is because the length of the conductor/interconnect lines may be different and since the delay through the buffer amid each AND gate may be different. Using known calibration techniques, the differences between the propagation delays in each signal path can be measured. As a result, the relative timing between the rising edges in primary event stream PES can be maintained.

Although event stream distributor 600 distributes primary event stream PES across eight rising edge secondary event streams SESR and eight falling edge secondary event streams SESF, it should be recognized that event stream distributor 600 can easily be modified such that there can be any number of rising edge secondary event streams SESR and any number of falling edge secondary event streams SESF depending on the requirements of a particular application.

IV. Event Stream Distributor Having Registered Outputs

Figure 7:
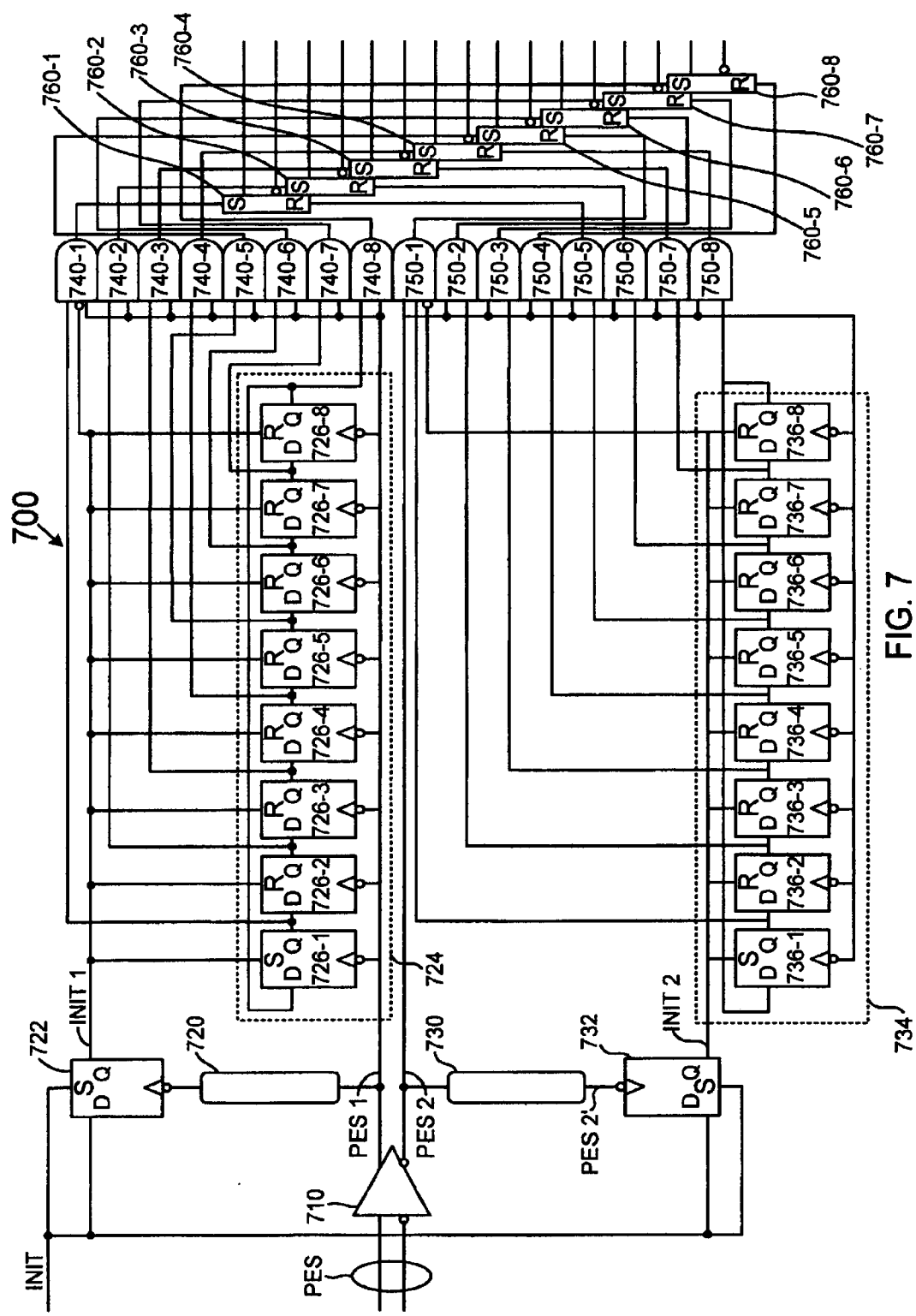
FIG. 7 is a schematic diagram of an event stream distributor that has registered secondary event stream outputs, according to some embodiments of the present invention.

FIG. 7 is a schematic diagram of an event stream distributor 700, according to some embodiments of the present invention. Event stream distributor 700 is identical to event stream distributor 200 of FIG. 2 except that event stream distributor 700 includes SR (set/reset) flip-flops 760 (separately labeled 760-1 through 760-8). The set S inputs of SR flip-flops 760 are coupled to the outputs of respective AND gates 740, while the reset R inputs of SR flip-flops 760 are coupled to the outputs of respective AND gates 750.

Event stream distributor 700 has been found to perform better than event stream distributors 200 and 600 if the event stream distributor is implemented on a first integrated circuit device and corresponding timestamp circuits are implemented on a second integrated circuit device. This is because event stream distributors 200 and 600 produce secondary event streams having relatively narrow pulse widths that may not be successfully transmitted from a first integrated circuit device to a second integrated circuit device due to packaging parasitics and board parasitics. SR flip-flops 760 of event stream distributor 700 minimize this problem by registering the outputs of AND gates 740 and 750. As a result, the secondary event streams SBS have relatively wide pulse widths that can be successfully transmitted from a first integrated circuit device to a second integrated circuit device. An additional advantage of using SR flip-flops 760 to register the outputs of AND gates 740 and 750 is that the number of output signals is reduced by a factor of 2.

Figure 8:
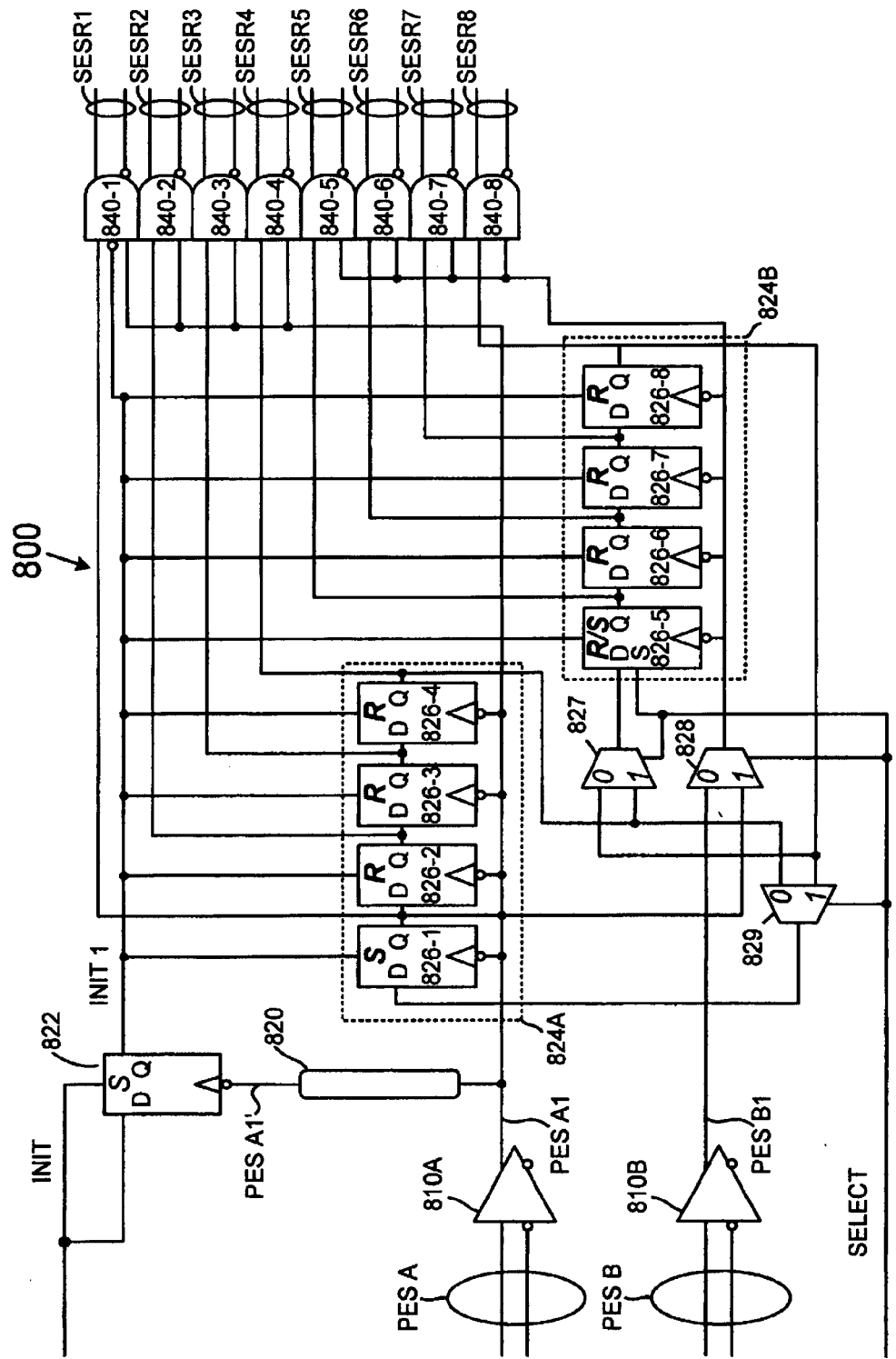
FIG. 8 is a schematic diagram of an event stream distributor that distributes two primary event streams, according to some embodiments of the present invention.

V. Event Stream Distributor Capable Of Distributing Multiple Primary Event Streams A. Structure FIG. 8 is a schematic diagram of an event stream distributor 800, according to some embodiments of the present invention. Event stream distributor 800 is similar to event stream distributor 200 of FIG. 2, except that event stream distributor 800 is capable of receiving a single primary event stream (i.e., PESa) and distributing it across a single set of secondary event streams (e.g., SESR1 through SESR8), or event stream distributor 800 is capable of receiving a first primary event stream (i.e., PESa) and distributing the first primary event stream across a first set of secondary event streams (i.e., SESR1 through SESR4) and is capable of receiving a second primary event stream (i.e., PESb) and distributing the second primary event stream across a second set of secondary event streams (i.e., SESR5 through SESR8). It should be recognized that event stream distributor 800 can be modified such any number of primary event streams can be distributed across any number of sets of secondary event streams.

Event stream distributor 800 includes an input portion and a rising edge distributor. For clarity, a corresponding falling edge distributor, which is similar to the rising edge distributor, is not shown. The input portion includes buffers 810a and 810b. The rising edge distributor includes a delay element 820, a D flip-flop 822, a Johnson counter having a first section 824a and a second section 824b, multiplexers 827, 828, and 829, and AND gates 840 (separately labeled 840-1 through 840-8). The first section 824a of the Johnson counter includes D flip-flops 826-1 through 826-4, and the second section 824b of the Johnson counter includes D flip-flops 826-5 through 826-8.

Buffer 810a is coupled to receive a first primary event stream PESa, and buffer 810b is coupled to receive a second primary event stream PESb. In the embodiment shown, first and second primary event streams PESa and PESb are differential signals. In other embodiments, first primary event stream PESa and/or second primary event stream PESb can be single-ended signals. Buffer 810a buffers primary event stream PESa and outputs non-inverted primary event stream PESa1 at its non-inverting output. Buffer 810b buffers primary event stream PESb and outputs non-inverted primary event stream PESb1 at its non-inverting output.

Delay element 820 is coupled to receive non-inverted primary event stream PESa1 at its input. Delay element 820 delays non-inverted primary event stream PESa1 and outputs delayed primary event stream PESa1'.

D flip-flop 822 is coupled to receive delayed primary event stream PESa1' at its inverting clock input. D flip-flop 822 is also coupled to receive an initialization signal INIT at its set S input and at its D input. D flip-flop 822 outputs an initialization signal INIT1 at its Q output Initialization signal INTT1 is used to set D flip-flop 826-1, reset D flip-flops 826-2 through 826-4, set or reset D flip-flop 826-5 (depending on the value of the select signal SELECT), and reset D flip-flops 826-6 through 826-8.

D flip-flops 826-1 through 826-4 of the first section 824a of the Johnson counter are coupled to receive non-inverted primary event stream PESa1 at their inverting clock inputs. As such, D flip-flops 826-1 through 826-4 are simultaneously clocked by the falling edges in primary event stream PESa1.

Multiplexer 828 is coupled to receive non-inverted primary event stream PESa1 and non-inverted primary event stream PESb1. Multiplexer 828 is also coupled to receive the select signal SELECT. D flip-flops 826-5 through 826-8 of the first section 824b of the Johnson counter are coupled to receive the output of multiplexer 828 at their inverting clock inputs. Depending on the value of the select signal SELECT, the output of multiplexer 828 is either non-inverted first primary event stream PESa1 or non-inverted second primary event stream PESb1. As such, D flip-flops 826-5 through 826-8 are simultaneously clocked by either the falling edges non-inverted first primary event stream PESa1 or non-inverted second primary event stream PESb1.

Depending on the value of the select signal SELECT, D flip-flops 826 of the first section 824a of the Johnson counter and D flip-flops 826 of the second section 824b of the Johnson counter are configured as a single ring or as two separate rings. If the select signal SELECT is at a logic high level, multiplexers 827 and 829 will configure the D flip-flops 826 of the first section 824a of the Johnson counter and the D flip-flops 826 of the second section 824b of the Johnson counter as a single ring.

In this configuration, the Q output of D flip-flop 826-1 is coupled to the D input of D flip-flop 826-2, the Q output of D flip-flop 826-2 is coupled to the D input of D flip-flop 826-3, the Q output of D flip-flop 826-3 is coupled to the D input of D flip-flop 826-4, the Q output of D flip-flop 826-4 is coupled to the D input of D flip-flop 826-5 (via multiplexer 827), the Q output of D flip-flop 826-5 is coupled to the D input of D flip-flop 826-6, the Q output of D flip-flop 826-6 is coupled to the D input of D flip-flop 826-7, the Q output of D flip-flop 826-7 is coupled to the D input of D flip-flop 826-8, and the Q output of D flip-flop 826-8 is coupled to the D input of D flip-flop 826-1 (via multiplexer 829) thereby forming a single ring.

If the select signal SELECT is at a logic low level, multiplexers 827 and 829 will configure the D flip-flops 826 of the first section 824*a* of the Johnson counter and the D flip-flops 826 of the second section 824*b* of the Johnson counter as two separate rings.

In this configuration, the Q output of D flip-flop 826-1 is coupled to the D input of D flip-flop 826-2, the Q output of D flip-flop 826-2 is coupled to the D input of D flip-flop 826-3, the Q output of D flip-flop 826-3 is coupled to the D input of D flip-flop 826-4, and the Q output of D flip-flop 826-4 is coupled to the D input of D flip-flop 826-1 to form a first ring. Additionally, the Q output of D flip-flop 826-5 is coupled to the D input of D flip-flop 826-6, the Q output of D flip-flop 826-6 is coupled to the D input of D flip-flop 826-7, the Q output of D flip-flop 826-7 is coupled to the D input of D flip-flop 826-8, and the Q output of D flip-flop 826-8 is coupled to the D input of D flip-flop 826-5 to form a second ring.

AND gates 840-1 through 840-4 are coupled to receive non-inverted primary event stream PESa1 at a first non-inverting input. AND gates 840-1 through 840-4 are also coupled to respective Q outputs of D flip-flops 826-1 through 826-4 at a second non-inverting input. AND gate 840-1 includes an inverting input that is coupled to receive initialization signal INIT1.

AND gates 840-5 through 840-8 are coupled to receive the output of multiplexer 828 at a first non-inverting input. AND gates 840-5 through 840-8 are also coupled to respective Q outputs of D flip-flops 826-5 through 826-8 at a second non-inverting input.

Each AND gate 840 outputs a respective rising edge secondary event stream SESR (separately labeled SESR1 through SESR8). In the embodiment shown, secondary event streams SESR are differential signals. In other embodiments, secondary event streams SESR can be single-ended signals.

B. Operation

Event stream distributor 800 operates in an initialization mode, a single primary event stream mode, and a dual primary event stream mode. When operating in initialization mode, first section 824*a* and second section 824*b* of the Johnson counter are initialized. When operating in single primary event stream mode, event stream distributor 800 distributes rising edge events in first primary event stream PESa among secondary event streams SESR1 through SESR8. When operating in dual primary event stream mode, event stream distributor 800 distributes rising edge events in first primary event stream PESa among secondary event streams SESR1 through SESR4 and distributes rising edge events in second primary event stream PESb among secondary event streams SESR5 through SESR8.

Event stream distributor 800 is placed in initialization mode by raising and holding initialization signal INIT at a logic high level. A falling edge in primary event stream PESa travels through buffer 810*a* and appears at the non-inverting output of buffer 810*a* as a falling edge in inverted primary event stream PESa1. This falling edge travels through delay element 820 and clocks D flip-flop 822 thereby raising initialization signal INIIT1 to a logic high level.

At this time, the select signal SELECT will be at a logic high level if event stream distributor 800 will subsequently operate in single primary event stream mode. In this case, the initialization signal INIT1 will set D flip-flop 826-1 and reset D flip-flops 826-2 through 826-8. On the other hand, the select signal SELECT will be at a logic low level if event stream distributor 800 will subsequently operate in dual primary event stream mode. In this case, the initialization signal INIT1 will set D flip-flops 826-1 and 826-5 and reset D flip-flops 826-2 through 826-4 and 826-6 through 826-8.

Note that secondary event streams SESR1 through SESR8 are held at logic low levels when event stream distributor 800 is in initialization mode. Event stream distributor 800 is then taken out of initialization mode and placed in normal mode by lowering and holding initialization signal INIT at a logic low level. The select signal SELECT, however, remains at the same logic level it was at during initialization mode (i.e., either a logic high level or a logic low level).

When operating in single primary event stream mode, the rising edge distributor of event stream distributor 800 operates in a manner similar to that described above with reference to event stream distributor 200. First primary event stream PESa is distributed across secondary event streams SESR1 through SESR8 and second primary event stream PESb is not used. Thus in operation, the first rising edge in first primary event stream PESa appears as the first rising edge in secondary event stream SESR1, the second rising edge in first primary event stream PESa appears as the second rising edge in secondary event stream SESR2, and so on until the seventh rising edge in first primary event stream PESa appears as the first rising edge in secondary event stream SESR7, the eighth rising edge in first primary event stream PESa appears as the first rising edge in secondary event stream SESR8, the ninth rising edge in first primary event stream PESa appears as the second rising edge in secondary event stream SESR1, the tenth rising edge in first primary event stream PESa appears as the second rising edge in secondary event stream SESR2, the eleventh rising edge in first primary event stream PESa appears as the second rising edge in secondary event stream SESR3, and so on.

When operating in dual primary event stream mode, the first section 824*a* of the Johnson counter in conjunction with AND gates 840-1 through 840-4 distribute the events of first primary event stream PESa across secondary event streams SESR1 through SESR4, and the second section 824*b* of the Johnson counter in conjunction with AND gates 840-5 through 840-8 distribute the events of second primary event stream PESb across secondary event streams SESR5 through SESR8. Thus in operation, the first rising edge in first primary event stream PESa appears as the first rising edge in secondary event stream SESR1, the second rising edge in first primary event stream PESa appears as the second rising edge in secondary event stream SESR2, the third rising edge in first primary event stream PESa appears as the first rising edge in secondary event stream SESR3, the fourth rising edge in first primary event stream PESa appears as the first rising edge in secondary event stream SESR4, the fifth rising edge in first primary event stream PESa appears as the second rising edge in secondary event stream SESR1, the sixth rising edge in first primary event stream PESa appears as the second rising edge in secondary event stream SESR2, and so on.

Similarly, the first rising edge in second primary event stream PESb appears as the first rising edge in secondary event stream SESR5, the second rising edge in second primary event stream PESb appears as the second rising edge in secondary event stream SESR6, the third rising edge in second primary event stream PESb appears as the first rising edge in secondary event stream SESR7, the fourth rising edge in second primary event stream PESb appears as the first rising edge in secondary event stream SESR8, the fifth rising edge in second primary event stream PESb appears as the second rising edge in secondary event stream SESR5, the sixth rising edge in second primary event stream PESb appears as the second rising edge in secondary event stream SESR6, and so on.

VI. Event Stream Distributor Including Cascading Configurations of Flip-flops

A. Structure

Figure 9A:
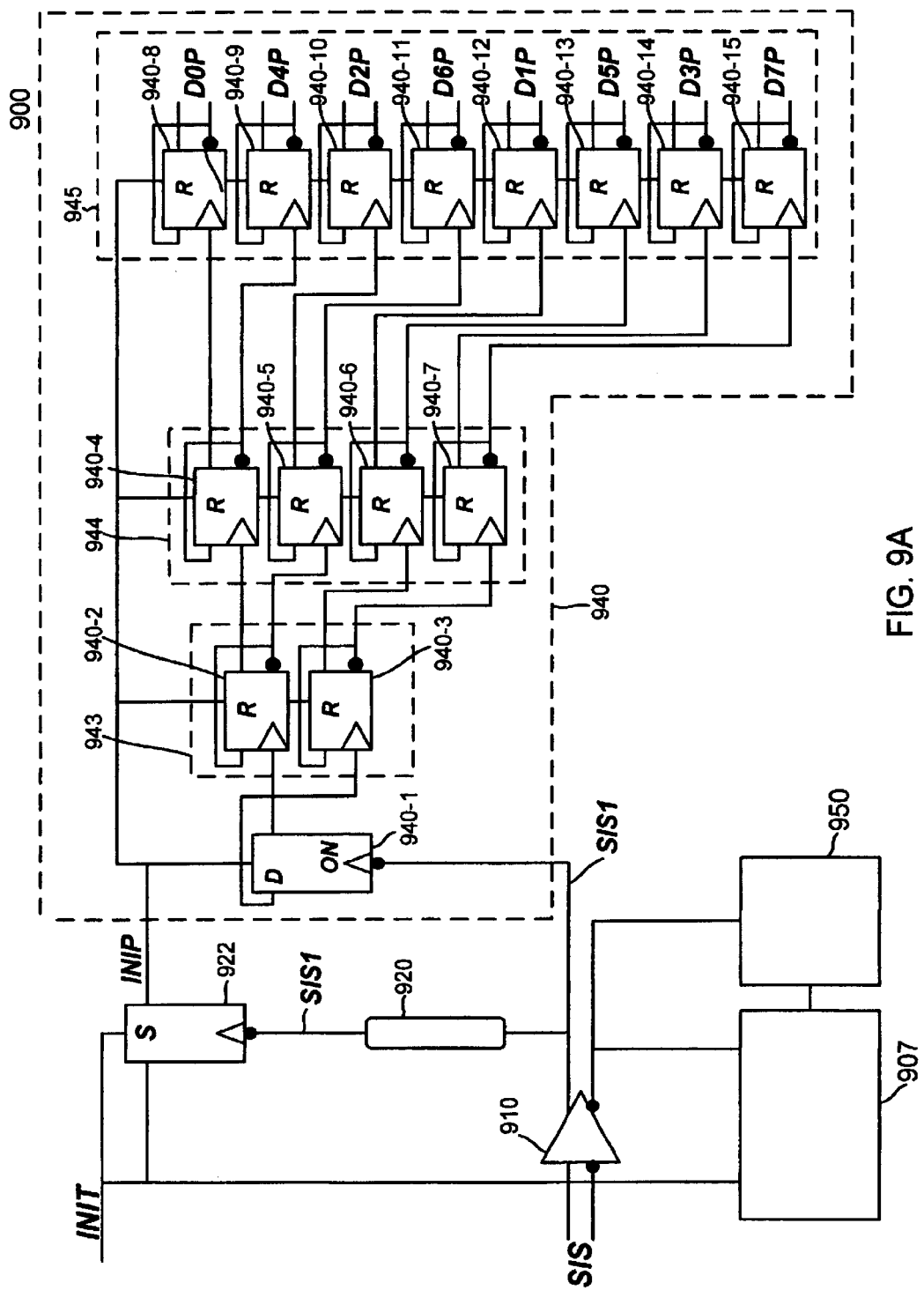
FIG. 9A is a schematic diagram of an event stream distributor that includes a rising edge distributor of an event stream distributor, according to some embodiments of the present invention.
Figure 9B:
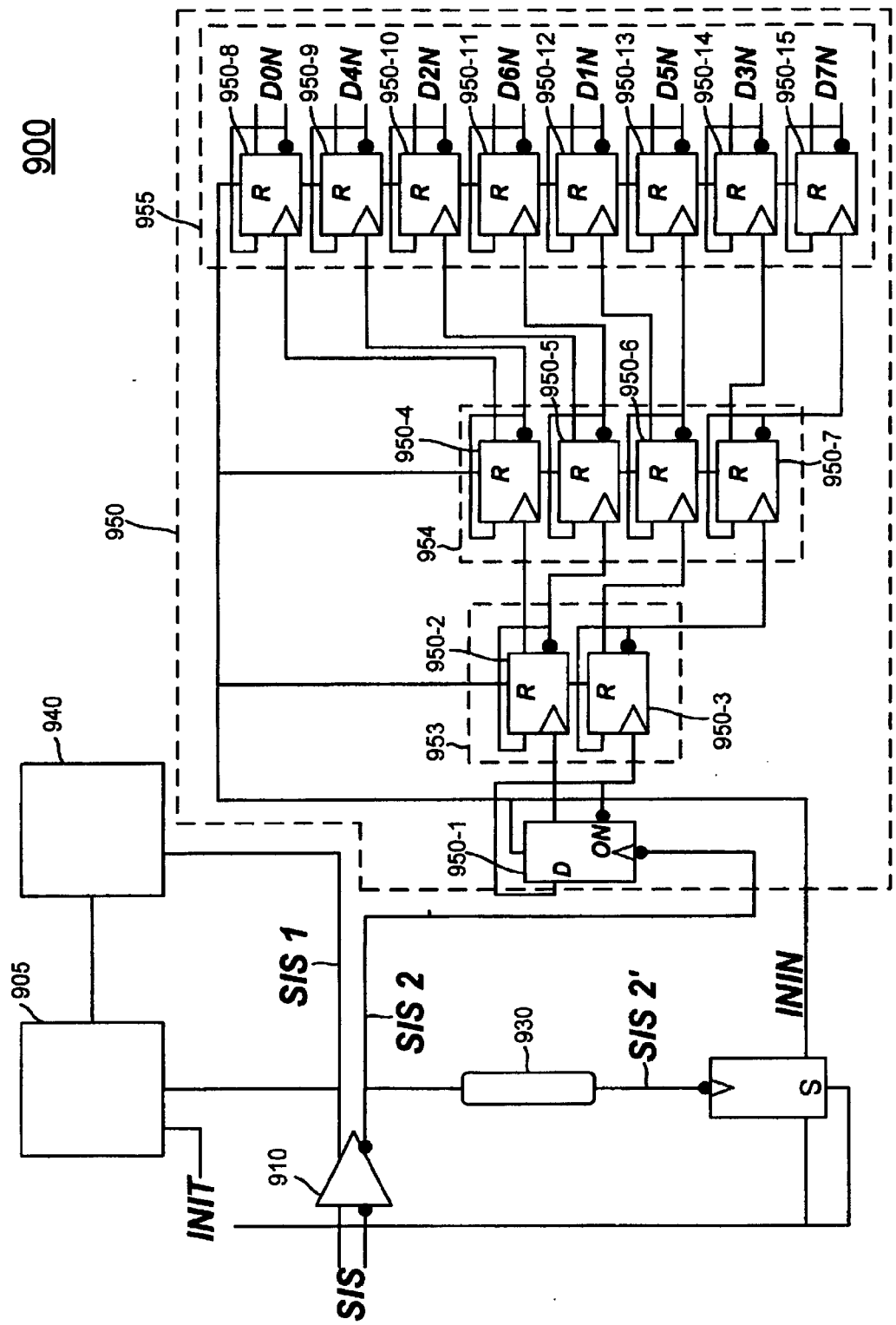
FIG. 9B is a schematic diagram of an event stream distributor that includes a falling edge distributor of an event stream distributor, according to some embodiments of the present invention.

FIGS. 9A and 9B are schematic diagrams of an event stream distributor 900, according to some embodiments of the present invention. Event distributor 900 includes an input portion, a rising edge distributor, and a falling edge distributor. The input portion includes a buffer 910. The rising edge distributor of FIG. 9A includes an initializing circuit 905 that includes a delay element 920 and an initializing D flip-flop 922. The rising edge distributor also includes a first plurality of D flip-flops 940 (separately labeled 940-1 through 940-15). The falling edge distributor of FIG. 9B includes an initializing circuit 907 that includes a delay element 930, and an initializing D flip-flop 932. The falling edge distributor also includes a second plurality of D flip-flops 950 (separately labeled 950-1 through 950-15).

Buffer 910 is coupled to receive a primary event stream PES. In the embodiment shown, primary event stream PES, shown as a serial input stream (SIS), is a differential signal. In other embodiments, serial input stream SIS is a single-ended signal. Buffer 910 receives serial input stream SIS, buffers serial input stream SIS, and outputs a non-inverted serial input stream SIS1 at its non-inverting output and outputs an inverted serial input stream SIS2 at its inverting output. The rising edge distributor of the event stream distributor 900 responds to the non-inverted serial input stream SIS on rising edges of the serial input stream SIS. The falling edge distributor of the event stream distributor 900 responds to the inverted serial input stream SIS on falling edges of the serial input stream SIS.

In the rising edge distributor of the event stream distributor 900 primarily shown in FIG. 9A, delay element 920 is coupled to receive non-inverted serial input stream SIS1 at its input. Delay element 920 delays non-inverted serial input stream SIS1 and outputs delayed serial input stream SIS1'.

D flip-flop 922 is coupled to receive delayed serial input stream SIS1' at its inverting clock input. D flip-flop 922 is also coupled to receive an initialization signal INIT at its set S input and at its D input. D flip-flop 922 outputs an initialization signal INIP at its Q output on the rising edge of a received signal. Initialization signal INIP is used to initialize D flip-flop 940-1 through 940-15 in the first plurality of flip-flops 940.

The first plurality of flip-flops 940 is coupled to receive the non-inverted serial input stream SIS1 at a non-inverting clock input of a single D flip-flop 940-1. Because, the serial input stream SIS1 is only coupled to a single D flip-flop, the cascading configuration of the first plurality of flip-flops cleanly distributes events to secondary event streams in the cascading configuration. As such, the cascading configuration of the first plurality of flip-flops can be more stable when distributing the serial input stream SIS1 to a plurality of secondary event streams at high speeds in comparison to an event stream distributor arranged in a ring like configuration (e.g., distributor 200) that couples a primary event stream to each of the flip-flops in a Johnson counter of FIG. 2.

The first plurality of flip-flops 940 includes a plurality of stages, including an input stage and an output stage. As shown in FIG. 9A, the input stage includes D-flip flop 940-1. An output stage 945 is also shown. Zero, one or more intermediate stages may also be included depending on the number of secondary event streams that are necessary to provide for precise timing of the events in the serial input stream SIS.

In particular, each stage beyond the input stage includes at least one pair of D flip-flops that are coupled to an associated flip-flop of a previous stage. That is, one D flip-flop of the pair of D flip-flops is coupled to the non-inverted Q output of the associated D flip-flop of the previous stage, and the other D flip-flop is coupled to the inverted Q output of the associated D flip-flop of the previous stage. For instance, D flip-flop 940-1 of the input stage is coupled to a pair of D flip-flops, 940-2 and 940-3. Each of the pair of D flip-flops 940-2 and 940-3 are also similarly coupled to successive pairs of D flip-flops in intermediate stage 944, and so on.

The pair of D flip-flops 940-2 and 940-3 comprise an intermediate stage 943 of single pair of D flip-flops 940-2 and 940-3. The intermediate stage 944 includes two pairs of D flip-flops. As shown in FIG. 9A, D flip-flop 940-2 of intermediate stage 943 is coupled to D flip-flops 940-4 and 940-5 in intermediate stage 944. Also, D flip-flop 940-3 of intermediate stage 943 is coupled to D flip-flops 940-6 and 940-7 in intermediate stage 944.

Similarly, each of the D flip-flops in the intermediate stage 944 is coupled to a pair of D flip-flops in the output stage 945. As shown in FIG. 2, D flip-flop 940-4 of intermediate stage 944 is coupled to D flip-flops 940-8 and 940-9 in the output stage 945. Also, D flip-flop 940-5 of intermediate stage 944 is coupled to D flip-flops 940-10 and 940-11 in the output stage 945. D flip-flop 940-6 of intermediate stage 944 is coupled to D flip-flops 940-12 and 940-13 in the output stage 945. Additionally, D flip-flop 940-7 of intermediate stage 944 is coupled to D flip-flops 940-14 and 940-15 in the output stage.

Most significantly, each of the D flip-flops of the first plurality of flip-flops 940 include a feedback coupling the inverting or negative Q output of a D flip-flop to a D input of the D flip-flop. As such, the D flip-flop toggles between high and low on successive clockings.

Correspondingly, in the falling edge distributor of the event stream distributor 900 primarily shown in FIG. 9B, delay element 930 is coupled to receive inverted serial input stream SIS2 at its input. Delay element 930 delays inverted serial input stream SIS2 and outputs delayed serial input stream SIS2'.

D flip-flop 932 is coupled to receive delayed serial input stream SIS2' at its inverting clock input. D flip-flop 932 is also coupled to receive the initialization signal INIT at its set S input and at its D input. D flip-flop 932 outputs an initialization signal ININ at its Q output on falling edges of a signal. Initialization signal ININ is used to set D flip-flop 950-1 and reset D flip-flops 950-2 through 950-15 in the second plurality of flip-flops 950.

The second plurality of flip-flops 950 is coupled to receive the inverted serial input stream SIS2 at a non-inverted clock input of a single D flip-flop 950-1. Because, the serial input stream SIS2 is only coupled to a single D flip-flop, the cascading configuration of the second plurality of flip-flops cleanly distributes events to secondary event streams in the cascading configuration. As such, the cascading configuration of the second plurality of flip-flops 950 can be more stable when distributing the serial input stream SIS2 to a plurality of secondary event streams at high speeds in comparison to an event stream distributor arranged in a ring like configuration (e.g., distributor 200) that couples a primary event stream to each of the flip-flops in a Johnson counter of FIG. 2.

The second plurality of flip-flops 950 includes a plurality of stages, including an input stage and an output stage. As shown in FIG. 9B, the input stage includes D-flip flop 950-1. An output stage 955 is also shown. Zero, one or more intermediate stages may also be included depending on the number of secondary event streams are necessary to provide for precise timing of the events in the serial input stream SIS.

In particular, each stage beyond the input stage includes at least one pair of D flip-flops that are coupled to an associated flip flop of a previous stage. That is, one D flip-flop of the pair of D flip-flops is coupled to the non-inverted Q output of the associated D flip-flop of the previous stage, and the other D flip-flop is coupled to the inverted Q output of the associated D flip-flop of the previous stage. For instance, D flip-flop 950-1 of the input stage is coupled to a pair of D flip-flops, 950-2 and 950-3. Each of the pair of D flip-flops 950-2 and 950-3 are also similarly coupled to successive pairs of D flip-flops in intermediate stage 954, and so on.

The pair of D flip-flops 950-2 and 950-3 comprise an intermediate stage 953 of a single pair of D flip-flops 950-2 and 950-3. The intermediate stage 954 includes two pairs of D flip-flops. As shown in FIG. 9B, D flip-flop 950-2 of intermediate stage 953 is coupled to D flip-flops 950-4 and 950-5 in intermediate stage 954. Also, D flip-flop 950-3 of intermediate stage 953 is coupled to D flip-flops 950-6 and 950-7 in intermediate stage 954.

Similarly, each of the D flip-flops in the intermediate stage 954 is coupled to a pair of D flip-flops in the output stage 955. As shown in FIG. 2, D flip-flop 950-4 of intermediate stage 954 is coupled to D flip-flops 950-8 and 950-9 in the output stage 955. Also, D flip-flop 950-5 of intermediate stage 954 is coupled to D flip-flops 950-10 and 950-11 in the output stage 955. D flip-flop 950-6 of intermediate stage 954 is coupled to D flip-flops 950-12 and 950-13 in the output stage 955. Additionally, D flip-flop 950-7 of intermediate stage 954 is coupled to D flip-flops 950-14 and 950-15 in the output stage.

Most significantly, each of the D flip-flops of the first plurality of flip-flops 950 include a feedback coupling the inverting or negative Q output of a D flip-flop to a D input of the D flip-flop. As such, the D flip-flop toggles between high and low on successive clockings.

B. Operation

Event stream distributor 900 operates in an initialization mode and a normal mode. When operating in initialization mode the first plurality of D-flip-flops 940 and the second plurality of D-flip-flops 950 are initialized. When operating in normal mode, the rising edge distributor of event stream distributor 900 distributes rising edge events in the serial input stream SIS among secondary event streams D0P through D7P. Similarly, the falling edge distributor of event stream distributor 900 distributes falling edge events in the serial input stream SIS among secondary event streams D0N through D7N.

Figure 10:
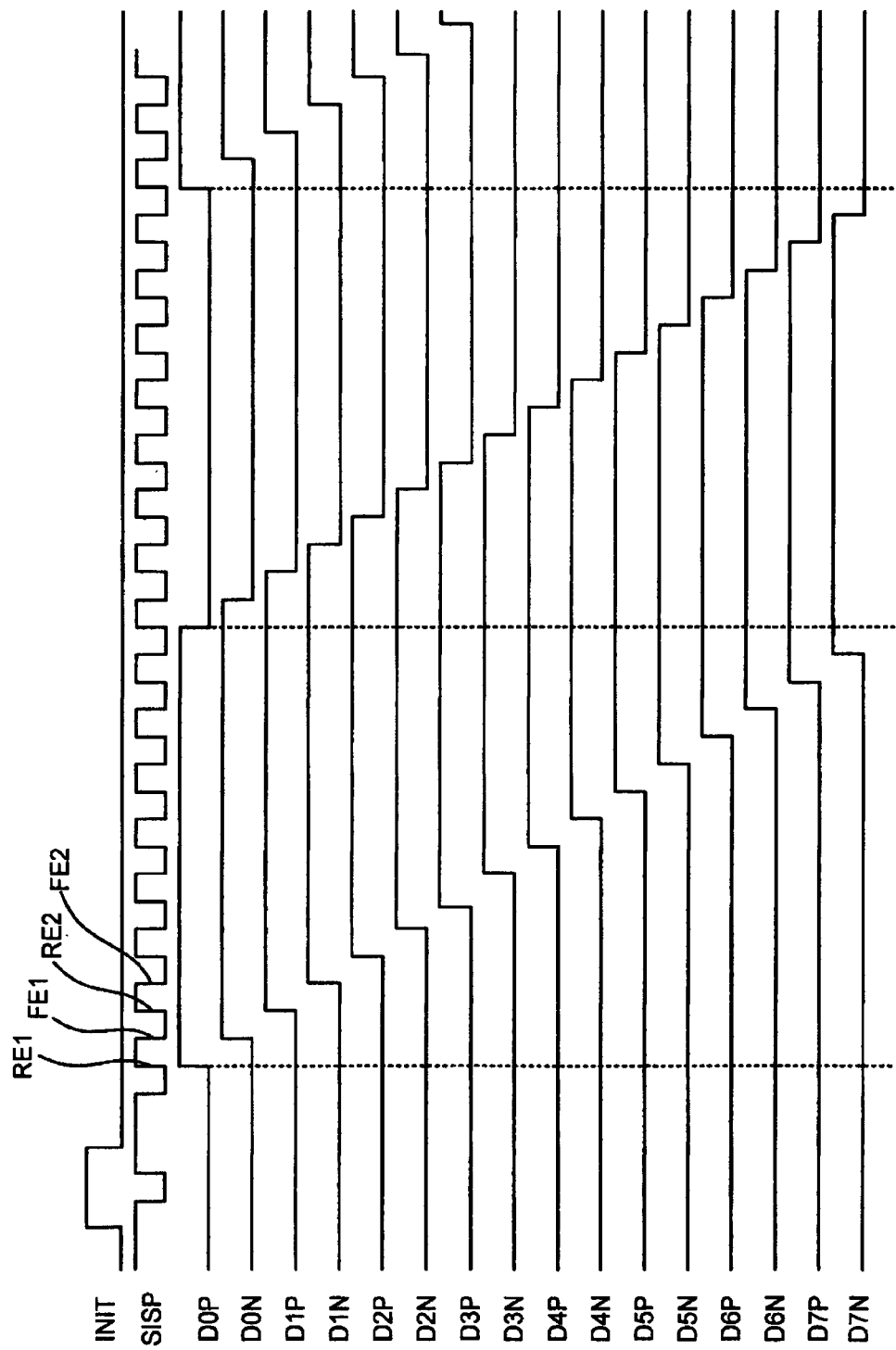
FIG. 10 is an exemplary timing diagram that includes waveforms for a primary event stream and corresponding secondary event streams, according to some embodiments of the present invention.

FIG. 10 is a timing diagram illustrating exemplary waveforms for a serial input stream SIS having a plurality of events and corresponding secondary event streams. As shown in FIG. 10, the rising edge distributor of the event stream distributor 900 produces secondary event streams D0P through D7P. Also, the falling edge distributor of the event stream distributor 900 produces secondary event streams D0N through D7N.

Event stream distributor 900 is placed in initialization mode by raising and holding initialization signal INIT at a logic high level. A falling edge in serial input stream SIS travels through buffer 910 and appears at the non-inverting output of buffer 910 as a falling edge in non-inverted serial input stream SIS1. This falling edge travels through delay element 920 and clocks D flip-flop 922, thereby raising initialization signal INIP to a logic high level. This sets D flip-flop 940-1. The remaining flip-flops, D flip-flops 940-2 though 940-15, in the first plurality of flip-flops 940 are forced into a reset condition.

After the initialization signal INIP falls to a logic low level, which signifies normal operation, the first D flip-flop 940-1 is forced into a reset condition. That is, upon the next high to low transition for the serial input stream SIS, the D flip-flop 940-1 is reset. As such, after initialization, all the D flip-flops in the first plurality of flip-flops 940 are in the reset condition.

Similarly, a rising edge in the serial input stream SIS travels through buffer 920 and appears at the inverting output of buffer 910 as a falling edge in inverted serial input stream SIS2. This falling edge travels through delay element 930 and clocks D flip-flop 932 thereby raising initialization signal ININ to a logic high level. This sets D flip-flop 950-1. The remaining flip-flops, D flip-flops 950-2 though 950-15, in the second plurality of flip-flops 950 are forced into a reset condition.

After the initialization signal ININ falls to a logic low level, the D flip-flop 950-1 is forced into a reset condition. That is, upon the next low to high transition for serial input stream SIS, the D flip-flop 950-1 is reset. As such, after initialization, all the D flip-flops in the second plurality of flip-flops 950 are in the reset condition.

Note that the secondary event streams D0P through D7P and D0N through D7N are held at logic low levels when event stream distributor 900 is in initialization mode. Event stream distributor 900 is taken out of initialization mode and placed into the normal mode by lowering and holding the initialization signal INIT at a logic low level.

When operating in normal mode, the rising edge distributor of event stream distributor 900 operates as follows. The first rising edge in serial input stream SIS (labeled RE1 in FIG. 10) propagates through buffer 910 and appears at the non-inverted output of buffer 910 as a rising edge in non-inverted serial input stream SIS1. As such, the rising edge in the non-inverted serial input stream SIS1 clocks a single D flip-flop 940-1.

Because of the feedback between the negative Q output and the input to D flip-flop 940-1, the rising edge of the positive Q output of D flip-flop 940-1 clocks D flip-flop 940-2. The negative Q output of D flip-flop 9401 exhibits a falling edge and does not clock flip-flops coupled via signal paths to the negative Q output. On the other hand, the rising edge of the Q output of the D flip-flop 940-2 clocks D flip flop 940-4. Lastly, the rising edge of the Q output of the D flip-flop 940-4 clocks D flip-flop 940-8, where it appears as the first rising edge in secondary event stream D0P . As a result, the first rising edge RE1 in the serial input stream SIS propagates along a single signal path in the cascade configuration of the first plurality of flip-flops 940 to generate the secondary event stream D0P . The secondary event stream D0P remains at a logic high level until the next time the D flip-flop 940-1 is clocked when the secondary event stream D0P transitions from a logic high to a logic low level.

The next rising edge of the serial input stream SIS (labeled RE2 in FIG. 10) also propagates through buffer 910 and appears at the non-inverted output of buffer 910 as a rising edge in non-inverted serial input stream SIS1. As such, the rising edge in the non-inverted serial input stream SIS1 clocks D flip-flop 940-1.

Because of the feedback between the negative Q output and the input to D flip-flop 940-1, the D flip-flop 940-1 toggles between high and low at its positive output for each successive clocking. As a result, the second rising edge RE2 of serial input stream SIS outputs a rising edge on the negative Q output of the D flip-flop 940-1 and a falling edge on the positive Q output of the D flip-flop 940-1. As such, the flip-flops coupled via signal paths to the positive Q output of D flip-flop 940-1 are not clocked and remain inactive.

On the other hand, the rising edge of the negative Q output of D flip-flop 940-1 clocks D flip-flop 940-3. Similarly, the rising edge of the positive Q output of the D flip-flop 940-3 clocks D flip flop 940-6. Lastly, the rising edge of the positive Q output of the D flip-flop 940-6 clocks D flip-flop 940-12, where it appears as the first rising edge in secondary event stream D1p. As a result, the second rising edge RE2 in the serial input stream SIS propagates along a single signal path in the cascade configuration of the first plurality of flip-flops 940 to generate the secondary event stream D1P. The secondary event stream D0P remains at a logic high level until the next time the D flip-flop 940-12 is clocked when the secondary event stream D1P transitions from a logic high to a logic low level.

The process described above continues so that the third rising edge in the serial input stream SIS appears as a rising edge in secondary event stream D2P, the fourth rising edge in the serial input stream appears as a rising edge in secondary event stream D3P, the fifth rising edge in the serial input stream appears as a rising edge in secondary event stream D4P, the sixth rising edge in the serial input stream appears as a rising edge in secondary event stream D5P, the seventh rising edge in the serial input stream appears as a rising edge in secondary event stream D6P, and the eighth rising edge in the serial input stream appears as a rising edge in secondary event stream D7P.

For the next eight rising edge transitions in the serial input stream SIS, the secondary event streams exhibit a falling edge transition. That is, the ninth rising edge in the serial input stream appears as a falling edge in secondary event stream D0P, the tenth rising edge in the serial input stream appears as a falling edge in secondary event stream D1P, and so on.

For the rising edge distributor of the event stream distributor 900, the secondary event streams D0P through D7P will transition every 8 cycles, a number equal to the number of flip-flops in the output stage 945. That is, for the first 8 rising edges, a transition from low to high will be exhibited for the secondary event streams D0P through D7P. The following 8 rising edges produce transitions from high to low in the secondary event streams D0P through D7P. This process continually repeats itself.

When operating in normal mode, the falling edge distributor of event stream distributor 900 operates as follows. The first falling edge in serial input stream SIS (labeled FE1 in FIG. 10) propagates through buffer 910 and appears at the inverted output of buffer 910 as a rising edge in inverted serial input stream SIS2. As such, the rising edge in the inverted serial input stream SIS2 clocks a single D flip-flop 950-1.

Because of the feedback between the negative Q output and the input to D flip-flop 950-1, the rising edge of the positive Q output of D flip-flop 950-1 clocks D flip-flop 950-2. The negative Q output of D flip-flop 950-1 exhibits a falling edge and does not clock flip-flops coupled via signal paths to the negative Q output. On the other hand, the rising edge of the Q output of the D flip-flop 950-2 clocks D flip flop 950-4. Lastly, the rising edge of the Q output of the D flip-flop 950-4 clocks D flip-flop 950-8, where it appears as the first rising edge in secondary event stream D0P. As a result, the first falling edge FE1 in the serial input stream SIS propagates along a single signal path in the cascade configuration of the second plurality of flip-flops 950 to generate the secondary event stream D0N. The secondary event stream D0N remains at a logic high level until the next time the D flip-flop 950-1 is clocked when the secondary event stream D0N transitions from a logic high to a logic low level.

The next falling edge of the serial input stream SIS (labeled FE2 in FIG. 10) also propagates through buffer 910 and appears at the inverted output of buffer 910 as a rising edge in inverted serial input stream SIS2. As such, the rising edge in the inverted serial input stream SIS2 clocks D flip-flop 950-1.

Because of the feedback between the negative Q output and the input to D flip-flop 950-1, the D flip-flop 950-1 toggles between high and low at its positive output for each successive clocking. As a result, the second falling edge FE2 of serial input stream SIS outputs a rising edge on the negative Q output of the D flip-flop 950-1 and a falling edge on the positive Q output of the D flip-flop 950-1. As such, the flip-flops coupled via signal paths to the positive Q output of D flip-flop 950-1 are not clocked and remain inactive.

On the other hand, the rising edge of the negative Q output of D flip-flop 950-1 clocks D flip-flop 950-3. Similarly, the rising edge of the positive Q output of the D flip-flop 950-3 clocks D flip flop 950-6. Lastly, the rising edge of the positive Q output of the D flip-flop 950-6 clocks D flip-flop 950-12, where it appears as the first rising edge in secondary event stream D1P. As a result, the second falling edge FE2 in the serial input stream SIS propagates along a single signal path in the cascade configuration of the second plurality of flip-flops 950 to generate the secondary event stream D1N. The secondary event stream D0P remains at a logic high level until the next time the D flip-flop 950-12 is clocked when the secondary event stream D1N transitions from a logic high to a logic low level.

The process described above continues so that the third falling edge in the serial input stream SIS appears as a rising edge in secondary event stream D2N, the fourth falling edge in the serial input stream appears as a rising edge in secondary event stream D3N, the fifth falling edge in the serial input stream appears as a rising edge in secondary event stream D4N, the sixth falling edge in the serial input stream appears as a rising edge in secondary event stream D5N, the seventh falling edge in the serial input stream appears as a rising edge in secondary event D6N, and the eighth falling edge in the serial input stream appears as a rising edge in secondary event stream D7N.

For the next eight falling edge transitions in the serial input stream SIS, the secondary event streams exhibit a falling edge transition. That is, the ninth falling edge in the serial input stream appears as a falling edge in secondary event stream D0N, the tenth rising edge in the serial input stream appears as a falling edge in secondary event stream D1N, and so on.

For the falling edge distributor of the event stream distributor 900, the secondary event streams D0N through D7N will transition every 8 cycles, or a number equal to the number of flip-flops in the output stage 955. That is, for the first 8 falling edges, a transition from low to high will be exhibited for the secondary event streams D0N through D7N. The following 8 falling edges in the serial input stream SIS produce transitions from high to low in the secondary event streams D0N through D7N. This process continually repeats itself.

Because of the feedback between the negative Q output and the input for each of the D flip-flops in the first plurality of flip-flops 940 and the second plurality of flip-flops 950, each of those D flip-flops toggles between high and low at its outputs for each successive clocking. As a result, every transition (rising edge or falling edge) in the serial input stream produces a single transition (high to low or low to high) in a corresponding secondary event stream.

Moreover, the event stream distributor 900 can be coupled to one or more time stamping circuits, as previously described in relation to FIG. 1. The time stamping circuits are coupled to the output stages of the first plurality of flip-flops 940 and second plurality of flip-flops 950 to provide timing of corresponding secondary event streams D0P through D7P and D0N through D7N.

Although event stream distributor 900 distributes serial input stream SIS across eight rising edge secondary event streams, D0P through D7P, and across eight falling edge secondary event streams, D0N through D7N, it should be recognized that event stream distributor 900 can easily be modified such that there can be any number of rising edge secondary event streams, and any number of falling edge secondary event streams, depending on the requirements of a particular application.

Figure 11:
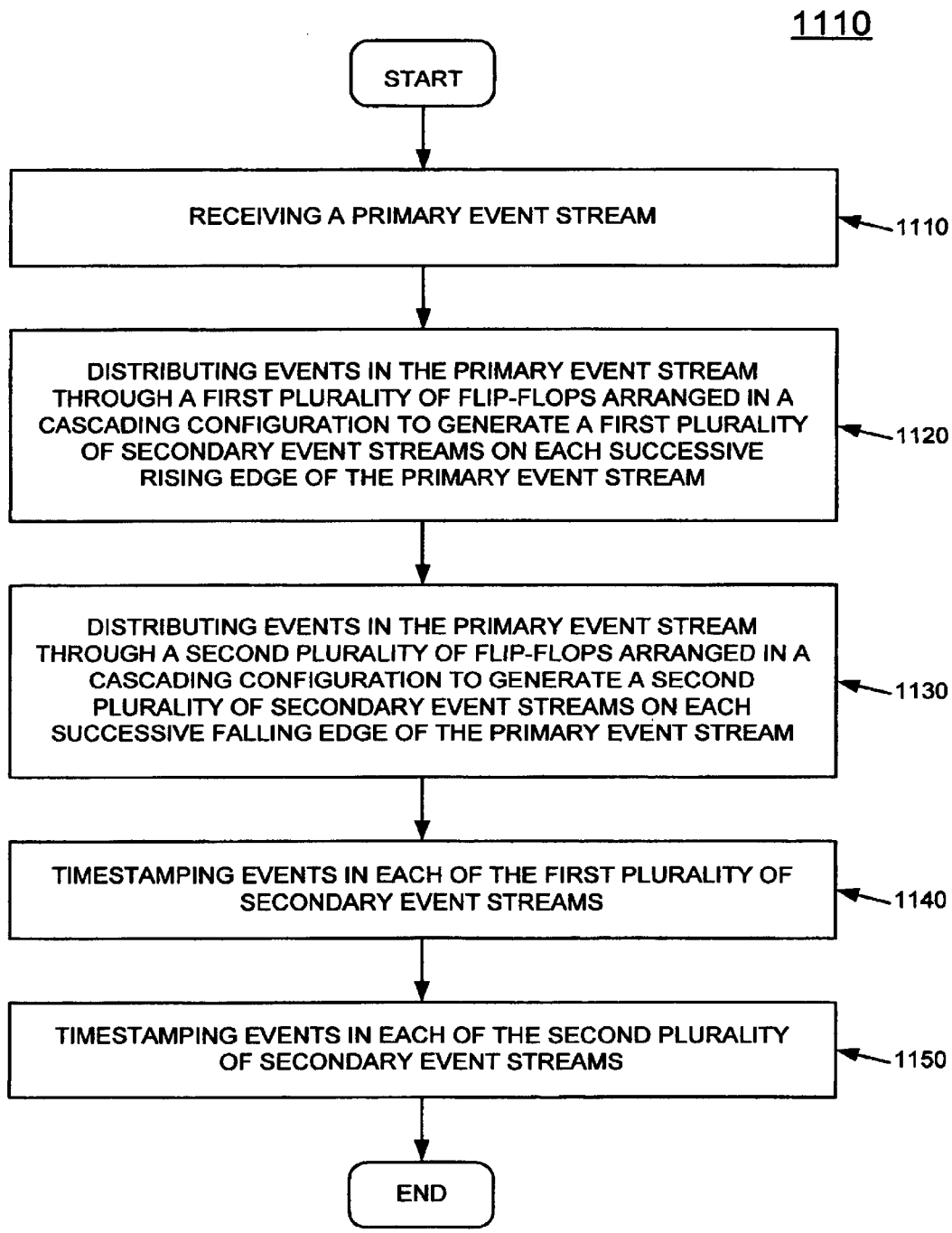
FIG. 11 is a flow chart illustrating a method for timestamping events in an event stream, according to some embodiments of the present invention.

FIG. 11 is a flow chart 1100 illustrating a method for distributing events in an event stream, according to some embodiments of the present invention. The method of flow chart 1100 is capable of distributing rising and falling edges of an event stream, or signal, among a plurality of secondary event streams.

At 1110, the present embodiment receives a primary event stream. As stated previously, the primary event stream can be a differential signal. In other embodiments, the primary event stream is a single-ended signal. In addition, the primary event stream is received after an initialization period of a plurality of flip-flops used for distributing the events.

At 1120, the present embodiment distributes events in the primary event stream through a first plurality of flip-flops arranged in a cascading configuration. The distribution of events generates a first plurality of secondary event streams on each successive rising edge of the primary event stream.

At 1130, the present embodiment distributes events in the primary event stream through a second plurality of flip-flops arranged in another cascading configuration. The distribution of events generates a second plurality of secondary event streams on each successive falling edge of the primary event stream.

At 1140, the present embodiment timestamps events in each of the first plurality of secondary event streams. In one embodiment, the timestamping of events is distributed with a resolution of less than one clock cycle. That is, the events in the primary event stream are distributed across the first plurality of secondary event streams in such a way that the event rate in each of the secondary event streams is lower than the event rate in the primary event stream.

In addition, at 1150, the present embodiment timestamps events in each of the second plurality of secondary event streams. In one embodiment, the timestamping of events is distributed with a resolution of less than one clock cycle. That is, the events in the primary event stream are distributed across the second plurality of secondary event streams in such a way that the event rate in each of the secondary event streams is lower than the event rate in the primary event stream.

VII. Alternative Embodiments

Accordingly, various embodiments of the present invention are described illustrating a circuit and method for distributing events in a signal through a plurality of secondary event streams. Embodiments of the present invention provide for precise marking of events in a primary event stream, even though the event rate in the primary event stream is high. Moreover, embodiments of the present invention provide for precise marking of events in a primary event stream through a cascading configuration of flip-flops that is stable since the input signal is directed to a single flip-flop.

While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the present invention.

What is claimed is:

1. A circuit for distributing events in a signal, comprising:
   a first plurality of flip-flops arranged in a cascading configuration for distributing a primary event stream into a first plurality of secondary event streams on each successive rising edge of said primary event stream;
   a second plurality of flip-flops arranged in another cascading configuration for distributing said primary event stream into a second plurality of secondary event streams on each successive falling edge of said primary event stream; and
   wherein flip-flops in said first and second plurality of flip-flops each comprise a feedback coupling a negative output to an input for toggling an associated flip-flop high and low on successively received clocks.

2. The circuit of claim 1, further comprising:
   a first initializing circuit coupled to said first plurality of flip-flops for initializing said first plurality of flip-flops; and
   a second initializing circuit coupled to said second plurality of flip-flops for initializing said second plurality of flip-flops.

3. The circuit of claim 2, wherein said first initializing circuit further comprises:
   an initializing flip-flop for receiving an initializing signal including an output, wherein said output is coupled to said first plurality of flip-flops for initializing said first plurality of flip-flops; and
   a delay buffer for clocking said initializing flip-flop, said delay buffer coupled to said primary event stream.

4. The circuit of claim 2, wherein said second initializing circuit further comprises:
   an initializing flip-flop for receiving an initializing signal including an output, wherein said output is coupled to said second plurality of flip-flops for initializing said second plurality of flip-flops; and a delay buffer for clocking said initializing flip-flop, said delay buffer coupled to said primary event stream.

5. The circuit of claim 1, further comprising:

a time stamping circuit coupled to output stages of said first plurality of flip-flops and said second plurality of flip-flops for providing timing of said first and second plurality of secondary event streams.

6. The circuit of claim 1, wherein flip-flops in said first and second plurality of flip-flops each comprises a D flip-flop.

7. The circuit of claim 1, wherein said primary event stream comprises a serial input signal.

8. The circuit of claim 1, wherein said primary event stream comprises a differential signal.

9. A secondary event distributor circuit for distributing events in a signal, comprising:

a first plurality of flip-flops for distributing a serial input signal into a first plurality of secondary event streams, wherein said first plurality of flip-flops is arranged in a cascading configuration comprising a plurality of stages, wherein each stage beyond a first input stage comprises at least one pair of flip-flops coupled to an associated flip flop of a previous stage, and wherein flip-flops in said first plurality of flip-flops each comprise a feedback coupling a negative output to an input for toggling an associated flip-flop high and low on successively received clocks.

10. The secondary event distributor circuit of claim 9, wherein said first plurality of secondary event streams is distributed on each successive rising edge of said serial input signal.

11. The secondary event distributor circuit of claim 11 further comprising:

a second plurality of flip-flops for distributing said serial input signal into a second plurality of secondary event streams, wherein said second plurality of flip-flops is arranged in another cascading configuration comprising a second plurality of stages, wherein each stage beyond a second input stage comprises at least one pair of flip-flops coupled to another associated flip flop of another previous stage, wherein said second plurality of secondary event streams is distributed on each successive falling edge of said serial input signal.

12. The secondary event distributor circuit of claim 11, wherein said first plurality of secondary event streams is distributed on each successive falling edge of said serial input signal.

13. The secondary event distributor circuit of claim 9, further comprising:

an initializing circuit coupled to said first plurality of flip-flops for initializing said first plurality of flip-flops.

14. The secondary event distributor circuit of claim 13, wherein said initializing circuit further comprises:

an initializing flip-flop for receiving an initializing signal including an output, wherein said output is coupled to said first plurality of flip-flops for initializing said first plurality of flip-flops; and a delay buffer for clocking said initializing flip-flop, said delay buffer coupled to said serial input stream.

15. The secondary event distributor circuit of claim 9, further comprising:

a time stamping circuit coupled to output stages of said first plurality of flip-flops for providing timing of said first plurality of secondary event streams.

16. The secondary event distributor circuit of claim 9, wherein said serial input signal comprises a differential signal.

17. A method for distributing events in a signal comprising:

receiving a primary event stream;

distributing events in said primary event stream through a first plurality of flip-flops arranged in a cascading configuration to generate a first plurality of secondary event streams on each successive rising edge of said primary event stream;

distributing events in said primary event stream through a second plurality of flip-flops arranged in another cascading configuration to generate a second plurality of secondary event streams on each successive falling edge of said primary event stream; and wherein flip-flops in said first and second plurality of flip-flops each comprise a feedback coupling a negative output to an input for totaling an associated flip-flop high and low on successively received clocks.

18. The method of claim 17, further comprising:

timestamping events in each of said first plurality of secondary event streams with a resolution of less than one clock cycle; and timestamping events in each of said second plurality of secondary event streams with a resolution of less than one clock cycle.

19. The method of claim 17, wherein said cascading configuration and said another cascading configuration each comprise a plurality of stages, wherein each stage beyond a first input stage comprises at least one pair of flip-flops coupled to an associated flip flop of a previous stage.

20. The method of claim 19, further comprising:

initializing said plurality of flip flops.

21. The method of claim 17, wherein said primary event stream comprises a differential signal.

22. The method of claim 17, wherein signals in said first and second plurality of secondary event streams are differential signals.

* * * * *